US010387795B1

(12) United States Patent
Oldridge et al.

(10) Patent No.: US 10,387,795 B1
(45) Date of Patent: Aug. 20, 2019

(54) SYSTEMS AND METHODS FOR TRAINING AND EMPLOYING A MACHINE LEARNING SYSTEM IN PROVIDING SERVICE LEVEL UPGRADE OFFERS

(71) Applicant: PLENTYOFFISH MEDIA INC., Vancouver (CA)

(72) Inventors: Steve Oldridge, Vancouver (CA); Sa Li, Vancouver (CA); Thomas S. Levi, Vancouver (CA)

(73) Assignee: PLENTYOFFISH MEDIA INC., Vancouver (CA)

( * ) Notice: Subject to any disclaimer, the term of this patent is extended or adjusted under 35 U.S.C. 154(b) by 1086 days.

(21) Appl. No.: 14/672,749

(22) Filed: Mar. 30, 2015

Related U.S. Application Data

(60) Provisional application No. 61/974,129, filed on Apr. 2, 2014.

(51) Int. Cl.
*G06N 20/00* (2019.01)
*G06N 5/04* (2006.01)

(52) U.S. Cl.
CPC ............... *G06N 20/00* (2019.01); *G06N 5/04* (2013.01)

(58) Field of Classification Search
CPC ................................ G06N 99/005; G06N 5/04
See application file for complete search history.

(56) References Cited

U.S. PATENT DOCUMENTS

| 5,583,763 | A | 12/1996 | Atcheson et al. |
| 5,724,521 | A | 3/1998 | Dedrick |
| 5,749,091 | A | 5/1998 | Ishida et al. |
| 5,812,992 | A * | 9/1998 | de Vries ................. G06N 3/082 706/15 |
| 5,963,951 | A | 10/1999 | Collins |
| 6,006,225 | A | 12/1999 | Bowman et al. |
| 6,018,738 | A | 1/2000 | Breese et al. |
| 6,038,295 | A | 3/2000 | Mattes |
| 6,041,311 | A | 3/2000 | Chislenko et al. |
| 6,049,777 | A | 4/2000 | Sheena et al. |

(Continued)

FOREIGN PATENT DOCUMENTS

WO 2008/030670 A1 3/2018

OTHER PUBLICATIONS

A Neural Network based Approach for Predicting Customer Churn in Cellular Network Services—2011 Sharma et al.*

(Continued)

*Primary Examiner* — Scott A. Waldron
*Assistant Examiner* — Ababacar Seck
(74) *Attorney, Agent, or Firm* — Seed Intellectual Property Law Group LLP

(57) ABSTRACT

A front-end system collects user attribute value data and organizes the data into one or more training data sets and one or more test data sets. The front-end system provides at least some of the test data sets to an input layer of a machine learning system. Within the machine learning system, one or more predictive models are constructed. At an output layer, the predictive models provide output data that includes at least a value indicative of whether a user will upgrade service levels based at least in part on the attribute values logically associated with the respective user. A back-end system generates upgrade offers for subsequent communication to those users identified as being likely to upgrade.

53 Claims, 10 Drawing Sheets

(56) References Cited

U.S. PATENT DOCUMENTS

| | | | |
|---|---|---|---|
| 6,058,367 A | 5/2000 | Sutcliffe et al. |
| 6,061,681 A | 5/2000 | Collins |
| 6,064,980 A | 5/2000 | Jacobi et al. |
| 6,134,532 A | 10/2000 | Lazarus et al. |
| 6,169,986 B1 | 1/2001 | Bowman et al. |
| 6,199,067 B1 | 3/2001 | Geller |
| 6,266,649 B1 | 7/2001 | Linden et al. |
| 6,356,879 B2 | 3/2002 | Aggarwal et al. |
| 6,542,749 B2 | 4/2003 | Tanaka et al. |
| 6,681,232 B1* | 1/2004 | Sistanizadeh ........ H04L 41/0213 |
| 6,735,568 B1 | 5/2004 | Buckwalter et al. |
| 6,772,150 B1 | 8/2004 | Whitman et al. |
| 6,782,370 B1 | 8/2004 | Stack |
| 6,783,065 B2 | 8/2004 | Spitz et al. |
| 6,853,982 B2 | 2/2005 | Smith et al. |
| 6,912,505 B2 | 6/2005 | Linden et al. |
| 7,113,917 B2 | 9/2006 | Jacobi et al. |
| 7,240,353 B2 | 7/2007 | Lau et al. |
| 7,313,536 B2 | 12/2007 | Westphal |
| 7,324,998 B2 | 1/2008 | Beres et al. |
| 7,562,814 B1 | 7/2009 | Shao et al. |
| 7,617,164 B2* | 11/2009 | Burges ................. G06N 99/005 706/15 |
| 7,873,695 B2 | 1/2011 | Clegg et al. |
| 8,122,142 B1 | 2/2012 | Svendsen et al. |
| 8,180,765 B2 | 5/2012 | Nicolov |
| 8,225,413 B1 | 7/2012 | De et al. |
| 8,499,247 B2 | 7/2013 | Niyogi et al. |
| 8,566,938 B1 | 10/2013 | Prakash et al. |
| 8,577,874 B2 | 11/2013 | Svendsen et al. |
| 8,620,790 B2 | 12/2013 | Priebatsch |
| 8,626,663 B2 | 1/2014 | Nightingale et al. |
| 8,775,284 B1 | 7/2014 | Crook et al. |
| 8,825,802 B2 | 9/2014 | Pearce |
| 8,930,398 B1 | 1/2015 | Kishore et al. |
| 9,047,611 B2 | 6/2015 | Krishnamoorthy et al. |
| 9,069,945 B2 | 6/2015 | Singh |
| 9,160,742 B1 | 10/2015 | Ackerman et al. |
| 9,218,468 B1* | 12/2015 | Rappaport ............... H04L 51/32 |
| 9,219,704 B2 | 12/2015 | Hamlin et al. |
| 9,536,221 B2 | 1/2017 | Frind |
| 9,537,706 B2 | 1/2017 | Frind et al. |
| 9,537,814 B2 | 1/2017 | Rubinstein et al. |
| 9,672,289 B1 | 6/2017 | Frind et al. |
| 9,679,259 B1 | 6/2017 | Frind et al. |
| 9,733,811 B2 | 8/2017 | Rad et al. |
| 9,830,669 B1 | 11/2017 | Frind |
| 9,836,533 B1 | 12/2017 | Levi et al. |
| 9,870,465 B1 | 1/2018 | Levi et al. |
| 2002/0091972 A1 | 7/2002 | Harris et al. |
| 2002/0095303 A1 | 7/2002 | Asayama et al. |
| 2002/0156632 A1 | 10/2002 | Haynes et al. |
| 2002/0184080 A1 | 12/2002 | Murad et al. |
| 2003/0065632 A1 | 4/2003 | Hubey |
| 2003/0065635 A1 | 4/2003 | Sahami et al. |
| 2003/0093405 A1 | 5/2003 | Mayer |
| 2003/0176931 A1* | 9/2003 | Pednault ............ G06F 17/30539 700/31 |
| 2003/0234519 A1 | 12/2003 | Farmer |
| 2004/0012638 A1 | 1/2004 | Donnelli et al. |
| 2004/0107283 A1 | 6/2004 | Paddon |
| 2004/0210640 A1 | 10/2004 | Chadwick et al. |
| 2004/0230527 A1 | 11/2004 | Hansen et al. |
| 2004/0260781 A1 | 12/2004 | Shostack et al. |
| 2005/0027707 A1 | 2/2005 | Syed |
| 2005/0080857 A1 | 4/2005 | Kirsch et al. |
| 2005/0108227 A1 | 5/2005 | Russell-Falla et al. |
| 2005/0108344 A1 | 5/2005 | Tafoya et al. |
| 2005/0223020 A1* | 10/2005 | Cutlip .................... G06Q 10/10 |
| 2005/0240608 A1 | 10/2005 | Jones et al. |
| 2006/0018522 A1 | 1/2006 | Sunzeri et al. |
| 2006/0059142 A1 | 3/2006 | Zvinyatskovsky et al. |
| 2006/0149766 A1 | 7/2006 | Ghoting et al. |
| 2006/0256959 A1 | 11/2006 | Hymes |
| 2007/0005587 A1 | 1/2007 | Johnson et al. |
| 2007/0061334 A1 | 3/2007 | Ramer et al. |
| 2007/0106659 A1* | 5/2007 | Lu ...................... G06F 17/30554 |
| 2007/0112792 A1 | 5/2007 | Majumder |
| 2007/0129999 A1 | 6/2007 | Zhou et al. |
| 2007/0156664 A1 | 7/2007 | Norton et al. |
| 2007/0206917 A1 | 9/2007 | Ono et al. |
| 2007/0233603 A1 | 10/2007 | Schmidgall et al. |
| 2007/0265962 A1 | 11/2007 | Bowie, Jr. et al. |
| 2007/0282621 A1 | 12/2007 | Altman et al. |
| 2008/0039121 A1 | 2/2008 | Muller |
| 2008/0086534 A1 | 4/2008 | Bardak et al. |
| 2008/0103971 A1 | 5/2008 | Lukose et al. |
| 2008/0140576 A1 | 6/2008 | Lewis et al. |
| 2008/0140681 A1 | 6/2008 | Ajibade |
| 2008/0189122 A1 | 8/2008 | Coletrane et al. |
| 2009/0016507 A1 | 1/2009 | Altberg et al. |
| 2009/0044279 A1 | 2/2009 | Crawford et al. |
| 2009/0066722 A1 | 3/2009 | Kriger et al. |
| 2009/0094048 A1 | 4/2009 | Wallace et al. |
| 2009/0106043 A1 | 4/2009 | Buckwalter et al. |
| 2009/0144329 A1 | 6/2009 | Marlow |
| 2009/0164464 A1 | 6/2009 | Carrico et al. |
| 2009/0216734 A1 | 8/2009 | Aghajanyan et al. |
| 2009/0248599 A1 | 10/2009 | Hueter et al. |
| 2009/0299645 A1 | 12/2009 | Colby et al. |
| 2010/0002920 A1 | 1/2010 | Cosatto et al. |
| 2010/0036806 A1 | 2/2010 | Lam et al. |
| 2010/0070350 A1 | 3/2010 | Paunikar et al. |
| 2010/0094767 A1 | 4/2010 | Miltonberger |
| 2010/0114614 A1 | 5/2010 | Sharpe |
| 2010/0145869 A1 | 6/2010 | Brown |
| 2010/0169376 A1 | 7/2010 | Chu |
| 2010/0262611 A1* | 10/2010 | Frind ................. G06F 17/30867 707/748 |
| 2010/0318544 A1 | 12/2010 | Nicolov |
| 2011/0055210 A1 | 3/2011 | Meredith et al. |
| 2011/0082824 A1* | 4/2011 | Allison ................. G06N 99/005 706/20 |
| 2011/0107260 A1 | 5/2011 | Park et al. |
| 2011/0125509 A1* | 5/2011 | Lidstrom ................ G06Q 30/02 705/1.1 |
| 2011/0131085 A1 | 6/2011 | Wey |
| 2011/0145238 A1 | 6/2011 | Stork |
| 2011/0167059 A1 | 7/2011 | Fallah |
| 2011/0178881 A1 | 7/2011 | Pulletikurty |
| 2011/0191768 A1* | 8/2011 | Smith ...................... G06F 9/445 717/176 |
| 2011/0208737 A1 | 8/2011 | Shmueli et al. |
| 2011/0219310 A1 | 9/2011 | Robson |
| 2011/0231396 A1 | 9/2011 | Dhara et al. |
| 2011/0270813 A1 | 11/2011 | Cok et al. |
| 2011/0306028 A1 | 12/2011 | Galimore |
| 2012/0059850 A1 | 3/2012 | Bent et al. |
| 2012/0088524 A1 | 4/2012 | Moldavsky et al. |
| 2012/0089618 A1 | 4/2012 | Anschutz et al. |
| 2012/0102410 A1 | 4/2012 | Gewecke et al. |
| 2012/0109959 A1 | 5/2012 | Benhadda |
| 2012/0110085 A1 | 5/2012 | Malik et al. |
| 2012/0123828 A1 | 5/2012 | Pahls et al. |
| 2012/0151417 A1 | 6/2012 | Wong et al. |
| 2012/0155296 A1* | 6/2012 | Kashanian .......... H04L 12/1417 370/252 |
| 2012/0158586 A1 | 6/2012 | Ganti et al. |
| 2012/0166285 A1 | 6/2012 | Shapiro et al. |
| 2012/0190386 A1* | 7/2012 | Anderson ............... G01C 15/04 455/456.3 |
| 2012/0197802 A1 | 8/2012 | Smith et al. |
| 2012/0198002 A1 | 8/2012 | Goulart et al. |
| 2012/0284212 A1* | 11/2012 | Lin ...................... G06N 99/005 706/12 |
| 2012/0284341 A1 | 11/2012 | Masood et al. |
| 2013/0097246 A1 | 4/2013 | Zifroni et al. |
| 2013/0138741 A1 | 5/2013 | Redstone et al. |
| 2013/0212680 A1 | 8/2013 | Winn et al. |
| 2013/0247149 A1 | 9/2013 | Sanft et al. |
| 2013/0262984 A1 | 10/2013 | Mehr et al. |
| 2013/0282745 A1 | 10/2013 | Mishra et al. |
| 2013/0297590 A1 | 11/2013 | Zukovsky et al. |
| 2013/0325948 A1 | 12/2013 | Chen et al. |

(56) References Cited

U.S. PATENT DOCUMENTS

| | | |
|---|---|---|
| 2014/0052861 A1 | 2/2014 | Frind et al. |
| 2014/0058763 A1 | 2/2014 | Zizzamia et al. |
| 2014/0079297 A1 | 3/2014 | Tadayon et al. |
| 2014/0095598 A1 | 4/2014 | Schornack et al. |
| 2014/0095603 A1 | 4/2014 | Bhardwaj et al. |
| 2014/0122628 A1 | 5/2014 | Yao et al. |
| 2014/0136933 A1 | 5/2014 | Berger et al. |
| 2014/0156750 A1 | 6/2014 | De Cristofaro et al. |
| 2014/0207637 A1 | 7/2014 | Groarke |
| 2015/0100530 A1* | 4/2015 | Mnih .................. G06N 3/0454 706/25 |
| 2015/0120583 A1 | 4/2015 | Zarrella |
| 2015/0127590 A1* | 5/2015 | Gay ........................ G06N 5/02 706/12 |
| 2015/0161649 A1 | 6/2015 | Eggleston et al. |
| 2015/0199010 A1* | 7/2015 | Coleman .............. A61B 5/0006 345/156 |
| 2015/0348208 A1 | 12/2015 | Nordyke et al. |
| 2015/0379574 A1 | 12/2015 | Pattan et al. |
| 2016/0292688 A1 | 10/2016 | Barton et al. |
| 2017/0242569 A1 | 8/2017 | Frind et al. |
| 2018/0039773 A1 | 2/2018 | Levi et al. |
| 2018/0052991 A1 | 2/2018 | Levi et al. |

OTHER PUBLICATIONS

Support Vector Machines for Transient Stability Analysis of Large-Scale Power Systems—2004 Moulin, et al.*

Frind et al., "Apparatus, Method and Article to Facilitate Matching of Clients in a Networked Environment," Amendment filed Dec. 8, 2015, for U.S. Appl. No. 13/971,483, 33 pages.

Frind et al., "Apparatus, Method and Article to Facilitate Matching of Clients in a Networked Environment," Office Action, dated Apr. 6, 2016, for U.S. Appl. No. 13/971,483, 26 pages.

Frind et al. "Apparatus, Method and Article to Facilitate Matching of Clients in a Networked Environment," Office Action, dated Sep. 21, 2015, for U.S. Appl. No. 13/971,483, 25 pages.

Frind et al., "Apparatus, Method and Article to Facilitate Matching of Clients in a Networked Environment," U.S. Appl. No. 61/857,617, filed Jul. 23, 2013,138 pages.

Frind et al., "Apparatus, Method and Article to Facilitate Matching of Clients in a Networked Environment," U.S. Appl. No. 61/691,082, filed Aug. 20, 2012, 131 pages.

Frind, "System and Method for Adaptive Matching of User Profiles Based on Viewing and Contact Activity for Social Relationship Services," Amendment filed Sep. 24, 2015, for U.S. Appl. No. 12/488,512, 14 pages.

Frind, "System and Method for Adaptive Matching of User Profiles Based on Viewing and Contact Activity for Social Relationship Services," Amendment filed Mar. 11, 2016, for U.S. Appl. No. 12/488,512, 15 pages.

Frind, "System and Method for Adaptive Matching of User Profiles Based on Viewing and Contact Activity for Social Relationship Services," Office Action, dated Jun. 24, 2015, for U.S. Appl. No. 12/488,512, 19 pages.

Frind, "System and Method for Adaptive Matching of User Profiles Based on Viewing and Contact Activity for Social Relationship Services," Office Action, dated Nov. 12, 2015, for U.S. Appl. No. 12/488,512, 21 pages.

Frind et al., "Systems and Methods for Training and Employing a Machine Learning System in Evaluating Entity Pairs," Amendment filed May 27, 2016, for U.S. Appl. No. 14/163,849, 23 pages.

Frind et al., "Systems and Methods for Training and Employing a Machine Learning System in Evaluating Entity Pairs," Office Action, dated Jan. 29, 2016, for U.S. Appl. No. 14/163,849, 61 pages.

Frind et al., "System and Methods for Training and Employing a Machine Learning System in Evaluating Entity Pairs," U.S. Appl. No. 61/756,912, filed Jan. 25, 2013, 75 pages.

Kuchka et al., "Apparatus, Method and Article to Identify Discrepancies Between Clients and in Response Prompt Clients in a Networked Environment," U.S. Appl. No. 61/780,391, filed Mar. 13, 2013, 92 pages.

Kuchka et al., "Apparatus, Method and Article to Identify Discrepancies Between Clients and in Response Prompt Clients in a Networked Environment," Office Action, dated Apr. 4, 2016, for U.S. Appl. No. 14/204,939, 80 pages.

Levi et al., "Apparatus, Method and Article to Facilitate Automatic Detection and Removal of Fraudulent User Information in a Network Environment, " U.S. Appl. No. 61/911,908, filed Dec. 4, 2013, 88 pages.

Levi et al., "Apparatus, Method and Article to Effect User Interest-Based Matching in a Network Environment," U.S. Appl. No. 61/976,296, filed Apr. 7, 2014, 111 pages.

MacKinnon, "Apparatus, Method and Article to Facilitate Exchange of Messages in a Network Environment," U.S. Appl. No. 61/918,466, filed Dec. 19, 2013, 83 pages.

Oldridge et al., "Apparatus, Method and Article to Effect Electronic Message Reply Rate Matching in a Network Environment," U.S. Appl. No. 61/914,154, filed Dec. 10, 2013, 50 pages.

Oldridge et al., "Apparatus, Method and Article to Facilitate User Behavioral Based Determination of User Values in a Network Environment," U.S. Appl. No. 14/737,121, filed Jun. 11, 2015, 68 pages.

Tekle et al. "Apparatus, Method and Article to Facilitate Automatic Detection and Removal of Fraudulent Advertising Accounts in a Network Environment," U.S. Appl. No. 61/948,159, filed Mar. 5, 2014, 79 pages.

Alsaleh et al., "Improving Matching Process in Social Network Using Implicit and Explicit User Information," *Web Technologies and Applications* 313-320, 2011.

Frind et al. "Systems and Methods for Training and Employing a Machine Learning System in Evaluating Entity Pairs," Office Action, dated Aug. 16, 2016, for U.S. Appl. No. 14/163,849, 60 pages.

Kuchka et al., "Apparatus, Method and Article to Identify Discrepancies Between Clients and in Response Prompt Clients in a Networked Environment," Amendment, dated Aug. 4, 2016, for U.S. Appl. No. 14/204,939, 38 pages.

Kuchka et al., "Apparatus, Method and Article to Identify Discrepancies Between Clients and in Response Prompt Clients in a Networked Environment," Office Action, dated Sep. 8, 2016, for U.S. Appl. No. 14/204,939, 104 pages.

Arbelaitz et al., "Web usage and content mining to extract knowledge for modelling the users of the Bidasoa Turismo website and to adapt it," *Expert Systems with Applications* 40(18):7478-7491, 2013.

Dokoohaki et al., "Mining Divergent Opinion Trust Networks through Latent Dirichlet Allocation," *International Conference on Advances in Social Networks Analysis and Mining*, IEEE/ACM, Istanbul, Turkey, pp. 879-886, 2012.

Geroimenko (Ed.) et al., *Visualizing the Semantic Web*, Springer, London, 2006, Chapter 14, pp. 229-241, Paolillo et al., "Social Network Analysis on the Semantic Web: Techniques and Challenges for Visualizing FOAF," 13 pages.

Khadangi et al., "Measuring Relationship Strength in Online Social Networks based on users' activities and profile information," *3rd International Conference on Computer and Knowledge Engineering*, Ferdowsi University of Mashhad, 2013, 5 pages.

Notice of Allowance, dated Aug. 2, 2017, for U.S. Appl. No. 14/668,808, Levi et al., "Apparatus, Method and Article to Effect User Interest-Based Matching in a Network Environment," 12 pages.

Parimi et al., "Predicting Friendship Links in Social Networks Using a Topic Modeling Approach," *Pacific-Asia Conference on Knowledge Discovery and Data Mining*, Advances in Knowledge Discovery and Data Mining, pp. 75-86, 2011.

Peled et al., "Entity Matching in Online Social Networks," *Proceedings of the 2013 International Conference on Social Computing*, pp. 339-344, 2013.

Zhao et al., "Relationship strength estimation for online social networks with the study on Facebook," *Neurocomputing* 95:89-97, 2012.

(56) References Cited

OTHER PUBLICATIONS

Office Action, dated Dec. 29, 2017, for U.S. Appl. No. 14/575,888, MacKinnon, "Apparatus, Method and Article to Facilitate Exchange of Messages in a Network Environment," 31 pages.
Office Action, dated Feb. 1, 2018, for U.S. Appl. No. 14/638,225, Tekle et al., "Apparatus, Method and Article to Facilitate Automatic Detection and Removal of Fraudulent Advertising Accounts in a Network Environment," 38 pages.
Office Action, dated Feb. 28, 2018, for U.S. Appl. No. 14/679,782, Oldridge et al., "Apparatus, Method and Article to Predict and Prevent Chargebacks in a Network Environment," 64 pages.
Office Action, dated Mar. 20, 2018, for U.S. Appl. No. 14/737,121, Oldridge et al., "Apparatus, Method and Article to Facilitate User Behavioral Based Determination of User Values in a Network Environment, " 39 pages.
"Binary search tree," Wikipedia, retrieved on Feb. 24, 2015, from http://en.wikipedia.org/wiki/Binary_search_tree, 11 pages.
"Chargeback," Wikipedia, retrieved on Feb. 24, 2015, from http://en.wikipedia.org/wiki/Chargeback, 4 pages.
"Merchant account," Wikipedia, retrieved on Feb. 24, 2015, from http://en.wikipedia.org/wiki/Mechant_account, 10 pages.
"Understanding Chargebacks: A Guide to Chargebacks for Online Merchants," DalPay, retrieved on Feb. 24, 2015, from https://www.dalpay.com/en/support/chargebacks.html, 6 pages.
Frind et al., "Apparatus, Method and Article to Facilitate Matching of Clients in a Networked Environment," U.S. Appl. No. 14/339,328, filed Jul. 23, 2014, 135 pages.
Frind et al., "Apparatus, Method and Article to Facilitate Matching of Clients in a Networked Environment," Preliminary Amendment filed Jul. 23, 2014, for U.S. Appl. No. 14/339,328, 11 pages.
Frind et al., "Systems and Methods for Training and Employing a Machine Learning System in Evaluating Entity Pairs," U.S. Appl. No. 14/163,849, filed Jan. 24, 2014, 75 pages.
Frind, "System and Method for Adaptive Matching of User Profiles Based on Viewing and Contact Activity for Social Relationship Services," Preliminary Amendment filed May 24, 2011, for U.S. Appl. No. 12/488,512, 22 pages.
Frind, "System and Method for Adaptive Matching of User Profiles Based on Viewing and Contact Activity for Social Relationship Services," Office Action dated Aug. 16, 2011, for U.S. Appl. No. 12/488,512, 14 pages.
Frind, "System and Method for Adaptive Matching of User Profiles Based on Viewing and Contact Activity for Social Relationship Services," Amendment filed Nov. 16, 2011, for U.S. Appl. No. 12/488,512, 16 pages.
Frind, "System and Method for Adaptive Matching of User Profiles Based on Viewing and Contact Activity for Social Relationship Services," Office Action dated Mar. 5, 2012, for U.S. Appl. No. 12/488,512, 19 pages.
Frind, "System and Method for Adaptive Matching of User Profiles Based on Viewing and Contact Activity for Social Relationship Services," Amendment filed May 24, 2012, for U.S. Appl. No. 12/488,512, 20 pages.
Frind, "System and Method for Adaptive Matching of User Profiles Based on Viewing and Contact Activity for Social Relationship Services," Office Action dated May 19, 2014, for U.S. Appl. No. 12/488,512, 20 pages.
Frind, "System and Method for Adaptive Matching of User Profiles Based on Viewing and Contact Activity for Social Relationship Services," Amendment filed Aug. 12, 2014, for U.S. Appl. No. 12/488,512, 11 pages.
Frind, "System and Method for Adaptive Matching of User Profiles Based on Viewing and Contact Activity for Social Relationship Services," Office Action dated Nov. 18, 2014, for U.S. Appl. No. 12/488,512, 17 pages.
Frind, "System and Method for Adaptive Matching of User Profiles Based on Viewing and Contact Activity for Social Relationship Services," Amendment filed Jan. 6, 2015, for U.S. Appl. No. 12/488,512, 12 pages.
Frind, "System and Method for Adaptive Matching of User Profiles Based on Viewing and Contact Activity for Social Relationship Services," Amendment filed Feb. 13, 2015, for U.S. Appl. No. 12/488,512, 12 pages.
Kuchka et al., "Apparatus, Method and Article to Identify Discrepancies Between Clients and in Response Prompt Clients in a Networked Environment," U.S. Appl. No. 14/204,939, filed Mar. 11, 2014, 92 pages.
Levi et al., "Apparatus, Method and Article to Effect User Interest-Based Matching in a Network Environment," U.S. Appl. No. 14/668,808, filed Mar. 25, 2015, 111 pages.
Levi et al., "Apparatus, Method and Article to Facilitate Automatic Detection and Removal of Fraudulent User Information in a Network Environment," U.S. Appl. No. 14/561,004, filed Dec. 4, 2014, 89 pages.
MacKinnon, "Apparatus, Method and Article to Facilitate Exchange of Messages in a Network Environment," U.S. Appl. No. 14/575,888, filed Dec. 18, 2014, 83 pages.
Oldridge et al., "Apparatus, Method and Article to Effect Electronic Message Reply Rate Matching in a Network Environment," U.S. Appl. No. 14/563,504, filed Dec. 8, 2014, 55 pages.
Oldridge et al., "Apparatus, Method and Article to Facilitate User Behavioral Based Dertermination of User Values in a Network Environment," U.S. Appl. No. 62/013,849, filed Jun. 18, 2014, 68 pages.
Oldridge et al., "Apparatus, Method and Article to Predict and Prevent Chargebacks in a Network Environment," U.S. Appl. No. 14/679,792, filed Apr. 6, 2015, 69 pages.
Tekle et al., "Apparatus, Method and Article to Facilitate Automatic Detection and Removal of Fraudulent Advertising Accounts in a Network Environment," U.S. Appl. No. 14/638,225, filed Mar. 4, 2015, 79 pages.
Therneau et al., "An Introduction to Recursive Partitioning Using the RPART Routines," Mayo Clinic, Feb. 24, 2015, 62 pages.
Fiore et al., "Assessing Attractiveness in Online Dating Profiles," *CHI 2008 Proceedings—Friends, Foe, and Family*, pp. 797-806, 2008.
Frind et al., "Apparatus, Method and Article to Facilitate Matching of Clients in a Networked Environment," Response, filed Jul. 21, 2016, for U.S. Appl. No. 13/971,483, 21 pages.
Notice of Allowance, dated Aug. 24, 2016, for U.S. Appl. No. 12/488,512, Frind, "System and Method for Adaptive Matching of User Profiles Based on Viewing and Contact Activity for Social Relationship Services," 20 pages.
Office Action, dated Sep. 20, 2016, for U.S. Appl. No. 14/339,328, Frind et al., "Apparatus, Method and Article to Facilitate Matching of Clients in a Networked Environment," 30 pages.
Artzi et al., "Predicting Responses to Microblog Posts," *NAACL HLT '12 Proceedings of the 2012 Conference of the North American Chapter of the Association for Computational Linguistics: Human Language Technologies*, Montreal, Canada , Jun. 3-8, 2012, pp. 602-606.
Avrahami et al., "Responsiveness in Instant Messaging: Predictive Models Supporting Inter-Personal Communication," *Proceedings of the SIGCHI Conference on Human Factors in Computing Systems*, Montréal, Québec, Canada, Apr. 22-27, 2006, pp. 731-740.
Kononenko, "Semi-Naïve Bayesian Classifier," *EWSL-91 Proceedings of the European working session on learning on Machine learning*, Porto, Portugal, 1991, pp. 206-219.
Notice of Allowance, dated Feb. 10, 2017, for U.S. Appl. No. 14/163,849, Frind et al., "Systems and Methods for Training and Employing a Machine Learning System in Evaluating Entity Pairs," 5 pages.
Notice of Allowance, dated Feb. 3, 2017, for U.S. Appl. No. 14/339,328, Frind et al., "Apparatus, Method and Article to Facilitate Matching of Clients in a Networked Environment," 14 pages.
Office Action, dated Feb. 3, 2017, for U.S. Appl. No. 14/561,004, Levi et al., "Apparatus, Method and Article to Facilitate Automatic Detection and Removal of Fraudulent User Information in a Network Environment," 23 pages.

(56) References Cited

OTHER PUBLICATIONS

Office Action, dated Jul. 13, 2017, for U.S. Appl. No. 14/638,225, Tekle et al., "Apparatus, Method and Article to Facilitate Automatic Detection and Removal of Fraudulent Advertising Accounts in a Network Environment," 59 pages.

Office Action, dated Jul. 5, 2017, for U.S. Appl. No. 14/563,504, Oldridge et al., "Apparatus, Method and Article to Effect Electronic Message Reply Rate Matching in a Network Environment," 20 pages.

Office Action, dated May 17, 2017, for U.S. Appl. No. 14/204,939, Kuchka et al., "Apparatus, Method and Article to Identify Discrepancies Between Clients and in Response Prompt Clients in a Networked Environment," 82 Pages.

Supplemental Notice of Allowability, dated Oct. 28, 2016, for U.S. Appl. No. 13/971,483, Frind et al., "Apparatus, Method and Article to Facilitate Matching of Clients in a Networked Environment," 9 pages.

Office Action, dated Jul. 26, 2018, for U.S. Appl. No. 14/575,888, MacKinnon, "Apparatus, Method and Article to Facilitate Exchange of Messages in a Network Environment," 41 pages.

Office Action, dated Oct. 11, 2018, for U.S. Appl. No. 14/204,939, Kuchka et al., "Apparatus, Method and Article to Identify Discrepancies Between Clients and in Response Prompt Clients in a Networked Environment," 66 pages.

Office Action, dated Aug. 28, 2018, for U.S. Appl. No. 15/782,354, Levi et al., "Apparatus, Method and Article to Facilitate Automatic Detection and Removal of Fraudulent User Information in a Network Environment," 9 pages.

Brammer, "Who Commits Online Advertising Fraus and How to Stip It," published online on Sep. 21, 2015, downloaded from http://blog.ezanga.com/blog/who-commits-online-avertising-fraud-and-how-to-stop-it on Jun. 16, 2018, 8 pages.

Notice of Allowance, dated Jun. 20, 2018, for U.S. Appl. No. 14/638,225, Tekle et al., "Apparatus, Method and Article to Facilitate Automatic Detection and Removal of Fraudulent Advertising Accounts in a Network Environment," 12 pages.

* cited by examiner

SYSTEMS AND METHODS FOR TRAINING AND EMPLOYING A MACHINE LEARNING SYSTEM IN PROVIDING SERVICE LEVEL UPGRADE OFFERS

BACKGROUND

Technical Field

The present disclosure generally relates to the field of machine learning.

Description of the Related Art

In contrast to traditional digital models used in configuring device decision making, machine learning systems instead perform decision making based on connections or pathways established between processing elements. Such structure is more closely analogous to the interconnected neurological pathways found in a biological brain. Within a neural network type machine learning system, the organization and weights assigned to particular connections determine the ultimate output data provided at the output layer of the machine learning system. Machine learning systems have been found to provide effective event predictions when trained using a large training data set including historical examples that promote the formation of connections within the machine learning system, the organization of the connections, and the weighting of the connections. During run-time operation of the machine learning system the organization and weighting of the connections provide the decision making capabilities within the machine learning system's system (e.g., modeling layer in neural networks). The run-time performance and accuracy of a machine learning system is to a large extent a function of these connections which, in turn, are dependent upon the training data quality provided during the training of the machine learning system. After completing the training process, machine learning systems can derive meaning from complicated or imprecise data and can extract patterns and detect trends that are too complex to be noticed by either humans or other computer techniques. In at least some instances, a trained machine learning system may be considered an "expert" in analyses performed on data that falls within the limits of training received by the machine learning system. As an "expert," a trained machine learning system hastens the analysis and derivation of relationships within a large volume of data having numerous known and unknown dependencies. Such a data volume and the presence of known and unknown dependencies render comparable human analysis time-consuming at best, and near-impossible in many instances. The strength of machine learning systems lies in the analysis of voluminous and complex data with a high degree of accuracy to ascertain the answers to various "what if" type questions.

Computer networks, in particular the Internet, have opened a new arena where service providers such as information based services (e.g., dictionary, encyclopedia, journals, periodicals, relationship building, and such) may provide limited access to services at little or even no cost to users. At least a portion of the cost to the service provider for supplying users with free-of-charge content may be offset by inserting paid third party content (e.g., advertisements) into the content delivered by the service provider to such "standard" service level users. Within the user population, at least a portion of the users may opt for a higher service level (often referred to as a "premium" service level) which may or may not be a paid or subscription style service. Generally, such higher service levels offer additional information, features, and/or services that are not provided in the free-of-charge content provided by the service provider. In some instances, third party content included in the services or content provided to users may be reduced or even eliminated.

BRIEF SUMMARY

A service provider (e.g., a relationship building Website) may offer multiple service levels offering different combinations of features and services. With a population that includes all users of the service, users may be variously identified as known upgraded users (i.e., users who have upgraded service), known non-upgraded users (i.e., users who have declined at least one opportunity to upgrade service), and "unclassified users" (i.e., users who have neither upgraded nor declined an offer to upgrade service). Allowing the service provider with the ability to accurately and reliably identify those users within a user population who are most likely to upgrade service levels enables the service provider to advantageously communicate timely and relevant upgrade offers to those users.

A service provider may collect data indicative of profile attribute values for any number of attributes for each user accessing the content on the service providers Webservers. Such profile attribute values may be self-reported by the user and include data indicative of the respective user's age, gender, income, location, marital status, profession, education, degree of commitment, height, body type, children, employment, religion, tobacco use, interest/lack of interest in another's children, interest/lack of interest in another's tobacco use, interest/lack of interest in another's ethnicity, interest/lack of interest in having children in the future, highest level of education, and the like.

Such attribute values may also be autonomously collected by the service provider, for example from one or more processor-based devices associated with the user and may include data indicative of the user's Internet service provider (ISP), ISP location, the user's Internet Protocol (IP) address, the user's bowser, operating system, communication device type, the respective user's communication device operating system, and/or access device, communication device Web browser, and the like.

The service provider may alternatively or additionally collect data indicative of behavior attribute values for any number of user behavior attributes for some or all users accessing the content on the service provider's Webservers. While such behavior related attribute values are generally autonomously collected, at times such behavior related attribute values may be self-reported. Typical behavior attribute values include the number of messages sent by the respective user, the number of messages received by the respective user, the average time to respond to a message by the respective user, and the like.

The profile attribute values and behavior attribute values for a user may be collected and logically associated with the respective user by the service provider. Over time, as greater numbers of attribute values are collected for an increasing user population, such attribute value data provides a valuable resource to predicting the likelihood of a user's further behavior based at least in part on the historical behavior of similar users. The sheer volume of the collected attribute value data however often impedes the analysis needed to identify those unclassified users within the user population who are most likely to upgrade service levels.

Machine learning systems are ideally suited for analyzing large volumes of data to identify patterns and relationships that would otherwise be undetectable or difficult to detect by other means. For example, attribute value data logically associated with known upgraded users within a user population and attribute value data logically associated with known non-upgraded users within the user population may be included in an initial data set generated by one or more front-end systems.

Attribute value data associated with a number of known upgraded users and a number of known non-upgrade users may be collected by the front-end system to provide a training data subset using the attribute value data included in the initial data set. The front-end system can provide the training data subset to the input layer of a machine learning system to train the machine learning system. After training the machine learning system can reliably and accurately provide output data indicative of at least whether a particular user is likely to upgrade service levels based at least in part on the attribute values logically associated with the particular user. In some instances, the machine learning system may additionally or alternatively provide output data indicative of a time or time range at which the particular user is most likely to upgrade. In some instances, the machine learning system may additionally or alternatively provide output data indicative of one or more service levels to which the particular user is most likely to upgrade.

Attribute value data associated with a number of known upgraded users and a number of known non-upgrade users may be collected by the front-end system to provide a test data subset using the data included in the initial data set. The users (and their logically associated attribute value data) included in the training data subset may be mutually exclusive of the users included in the test data subset. The front-end system can provide the test data subset to the input layer of the machine learning system to assess the accuracy of the model (e.g., neural network, boosted trees, or random forests) generated by the machine learning system responsive to the supply of the training data subset to the machine learning system.

Continuously, periodically, or from time-to-time, the front-end system can provide attribute value data logically associated with users in the total user population (unclassified users—users who are neither known upgraded users nor known non-upgraded users) to the input layer of the machine learning system. In response to the receipt of the user attribute value data at the input layer, the machine learning system can generate output data at the output layer indicative of at least the likelihood that a particular user will upgrade.

A back-end system communicably coupled to the output layer of the machine learning system receives the output data and may optionally logically associate the output data with the particular user. The back-end system can compare the output data for the particular user with one or more defined threshold values or one or more defined threshold ranges to determine whether an upgrade offer should be communicated to the particular user. In some instances, the output data may include data indicative of a future time or temporal range at which the particular user is most like to upgrade and the upgrade offer should be communicated. In some instances, the output data may include data indicative of a defined service level to which the particular user is most like to upgrade and which the upgrade offer should include.

What is needed therefore are improved machine learning systems and methods to identify users within a user population who are likely to upgrade service levels based at least in part on the attribute values logically associated with known upgraded users.

A training system to train at least a machine learning system that identifies users likely to upgrade from a lower service level to a higher service level offered by a service provider may be summarized as including: at least one front-end, non-transitory, processor-readable, storage medium that stores at least one of processor-executable instructions or data; and at least one front-end system processor communicably coupled to an input layer of a machine learning system and to the at least one front-end, non-transitory, processor-readable, storage medium, the at least one front-end system processor that in use, executes the processor-executable instructions and in response: forms an initial data set from data representative of a user population, the initial data set including at least: a training data subset that includes digital data representative of attribute value information logically associated with a number of known upgraded users and digital data representative of attribute value information logically associated with a number of known non-upgraded users; and provide at least a portion of the training data subset as training examples to the input layer of the machine learning system.

The processor-executable instructions that cause the at least one front-end system processor to form an initial data set including at least a training data set from a user population, may further cause the at least one front-end system processor to: form an initial data set from the user population that, in addition to the training data subset, further includes a test data subset including digital data representative of attribute value information logically associated with a number of known upgraded users and digital data representative of attribute value information logically associated with a number of known non-upgraded users. The processor-executable instructions that cause the at least one front-end system processor to form the initial data set from the user population, the initial data set including at least the training data subset and the test data subset, may further cause the at least one front-end system processor to: form the initial data set that includes digital data representative of attribute value information logically associated with each of the users, the attribute value information corresponding to at least one of: a number of user profile attributes associated with each of at least some of the users, or a number of user behavioral attributes associated with each of at least some of the users. The processor-executable instructions that cause the at least one front-end system processor to form an initial data set that includes digital data representative of user-profile attribute value information logically associated with each of at least some of the users may further cause the at least one front-end system processor to: form an initial data set that includes digital data representative of user profile attribute value information corresponding to a number of profile attributes that include one or more of: a value representative of the respective user's age; a value representative of the respective user's location; a value representative of the respective user's income; a value representative of the respective user's highest level of education; a value representative of the respective user's communication device type; a value representative of the respective user's communication device operating system; a value representative of the respective user's communication device Web browser; a value representative of the respective user's Internet protocol (IP) address; a value representative of the respective user's Internet service provider (ISP); and a value representative of the respective user's ISP location. The processor-executable instructions that cause the at least one front-end system processor to form an initial data set that includes digital data representative of attribute value information logically associated with each of at least some of the users may further cause the at least one front-end system processor to: form an initial data set that includes digital data representative of user behavior attribute value information corresponding to a number of profile attributes that include one or more of: a value representative of an average elapsed time since the respective user's first association with the service provider; a value representative of an average elapsed time for the respective user to respond to incoming communications from other users; and a value representative of an average correspondence length from the respective user to one or more other users of one or more services provided by the service provider. The processor-executable instructions that cause the at least one front-end system processor to form an initial data set from a user population, the initial data set including at least a training data subset and a test data subset, may further cause the at least one front-end system processor to: apportion the initial data set into the training data subset and the test data subset; wherein the known upgraded users included in the training data subset are mutually exclusive of the known upgraded users included in the test data subset; and wherein the known non-upgraded users included in the training data subset are mutually exclusive of the known non-upgraded users included in the test data subset. The processor-executable instructions may further cause the at least one front-end system processor to: generate hypothetical user attribute value information; and form a logical association that links the generated hypothetical user attribute value information to one of a number of hypothetical users. The processor-executable instructions that cause the at least one front-end system processor to generate hypothetical user attribute value may cause the at least one front-end system processor to: generate the hypothetical user attribute value information by autonomously altering attribute value information logically associated with a known upgraded user included in the user population. The processor-executable instructions that cause the at least one front-end system processor to form an initial data set from a user population, the initial data set including at least a training data subset, may further cause the at least one front-end system processor to: form an initial data set from a user population, the initial data set including at least a training data subset that includes digital data representative of attribute value information logically associated with the number of known upgraded users, the number of known non-upgraded users, and a number of front-end system generated hypothetical upgraded users. The processor-executable instructions may further cause the at least one front-end system processor to: provide at least a portion of the test data subset to a trained machine learning system; receive output data from the output layer of the trained machine learning system, the output data indicative of a probability that a particular user included in the test data subset will upgrade from a lower service level to a higher service level offered by a service provider based at least in part on the attribute value information logically associated with the particular user; form a logical association linking the output data received from the output layer of the trained machine learning system to the particular user; compare the output data logically associated with the particular user with data indicative of whether the particular user is a known upgraded user or a known non-upgraded user; and assess at least one accuracy parameter associated with the trained machine learning system. The processor-executable instructions may further cause the at least one front-end system processor to: from time-to-time, autonomously review the user population to identify at least one of: known upgraded users or known non-upgraded users present in the user population; and autonomously update the training data subset to generate an updated training data subset and autonomously update the test data subset to generate an updated test data subset. The processor-executable instructions may further cause the at least one front-end system processor to: from time-to-time, autonomously provide at least the updated training data subset to the input layer of the machine learning system to provide an updated, trained, machine learning system; from time-to-time, autonomously provide at least the updated test data subset to the input layer of the updated, trained, machine learning system; receive output data from the output layer of the updated, trained, machine learning system, the output data indicative of a probability that a particular user included in the updated test data subset will upgrade from a lower service level to a higher service level offered by a service provider based at least in part on the attribute value information logically associated with the particular user; form a logical association linking the output data received from the output layer of the updated, trained, machine learning system to the particular user; compare the output data logically associated with the particular user with data indicative of whether the particular user is a known upgraded user or a known non-upgraded user; and assess at least one accuracy parameter associated with the updated, trained, machine learning system. The processor-executable instructions responsible for causing the at least one front-end system processor to assess at least one accuracy parameter associated with the updated, trained, machine learning system may further cause the at least one front-end system processor to: autonomously compare the accuracy of at least one updated predictive model used by the updated, trained, machine learning system with one or more defined accuracy threshold values; and reject the at least one predictive model responsive to the accuracy of the at least one updated predictive model falling below the one or more defined accuracy threshold values. The processor-executable instructions that cause the at least one front-end system processor to provide the machine learning system with at least the training data subset as training examples, may further cause the at least one front-end system processor to: provide the machine learning system with at least the training data subset as training examples, wherein the machine learning system includes a neural network; establish connections within the neural network based at least in part on the attribute values logically associated with users included in the training data subset; and weight the connections within the neural network based at least in part on the attribute values logically associated with users included in the training data subset. The processor-executable instructions that cause the at least one front-end system processor to weight the connections within the neural network may further cause the at least one front-end system processor to: weight the connections within the neural network using back propagation. The processor-executable instructions that cause the at least one front-end system processor to provide the machine learning system with at least the training data subset as training examples, may further cause the at least one front-end system processor to: provide the machine learning system with at least the training data subset as training examples, wherein the machine learning system includes at least one of a boosted trees analysis model or a random forests analysis model. The processor-executable instructions that cause the at least one front-end system processor to provide the machine learning system with at least the training data subset as training examples, may further cause the at least one front-end system processor to: receive output data from the output layer of the machine learning system; determine whether one or more training parameters indicative of one or more performance aspects of the machine learning system has plateaued; and terminate the provision of the machine learning system with the training data subset in response to determining that the one or more training parameters has plateaued. The processor-executable instructions that cause the at least one front-end system processor to determine whether one or more training parameters indicative of one or more performance aspects of the machine learning system has plateaued may further cause the at least one front-end system processor to: determine whether a defined number of machine learning system training epochs has been reached; and terminate the provision of the training data subset to the machine learning system responsive to determining that the defined number of machine learning system training epochs has been reached. The training system may further include: at least one communications interface communicably coupled to the at least one front-end system processor, the at least one communications interface communicably coupleable via one or more intervening networks to any number of user processor-based devices, each of the user processor based devices logically associated with at least one users included in the user population. The one or more intervening networks may include the Internet.

A method of training at least a machine learning system that identifies users likely to upgrade from a lower service level to a higher service level offered by a service provider may be summarized as including: forming by at least one front-end system processor an initial data set from a user population, the initial data set including at least: a training data subset that includes digital data representative of attribute value information logically associated with a number of known upgraded users and with a number of known non-upgraded users;

providing the machine learning system with at least a portion of the training data subset as a training example.

Forming by the at least one processor the initial data set from the user population, the initial data set including at least the training data subset may further include: forming, by the at least one front-end system processor, the initial data set from the user population to further include a test data subset including digital data representative of attribute value information logically associated with a number of known upgraded users and digital data representative of attribute value information logically associated with a number of known non-upgraded users. Forming the initial data set from the user population, the initial data set including at least the training data subset and the test data subset may further includes forming, by the at least one front-end system processor, the initial data set that includes digital data representative of attribute value information logically associated with each of the users, the attribute value information corresponding to at least one of: a number of user profile attributes associated with each of at least some of the users, or a number of user behavioral attributes associated with each of at least some of the users. Forming the initial data set that includes digital data representative of user profile attribute value information logically associated with each of at least some of the users may include: forming, by the at least one front-end system processor, the initial data set to include digital data representative of user profile attribute value information corresponding to a number of user profile attributes that include one or more of: a value representative of the respective user's age; a value representative of the respective user's location; a value representative of the respective user's income; a value representative of the respective user's highest level of education; a value representative of the respective user's communication device type; a value representative of the respective user's communication device operating system; a value representative of the respective user's communication device Web browser; a value representative of the respective user's Internet protocol (IP) address; a value representative of the respective user's Internet service provider (ISP); and a value representative of the respective user's ISP location. Forming the initial data set that includes digital data representative of user behavior attribute value information logically associated with each of at least some of the users may include forming, by the at least one front-end system processor, the initial data set to include digital data representative of user behavior attribute value information corresponding to a number of user behavior profile attributes that include at least one of: a value representative of an average elapsed time since the respective user's first association with the service provider; a value representative of an average elapsed time for the respective user to respond to incoming communications from other users; and a value representative of an average correspondence length from the respective user to one or more other users of one or more services provided by the service provider. Forming the initial data set from the user population may include: apportioning, the initial data set into the training data subset and the test data subset; wherein the known upgraded users included in the training data subset are mutually exclusive of the known upgraded users included in the test data subset; and wherein the known non-upgraded users included in the training data subset are mutually exclusive of the known non-upgraded users included in the test data subset. The training method may further include: generating, by the at least one front-end system processor, hypothetical user attribute value information; and forming, by the at least one front-end system processor, a logical association linking the generated hypothetical user attribute value information to one of a number of hypothetical users. Generating the hypothetical user attribute value information logically associated with one of a number of hypothetical users may include: generating, by the at least one front-end system processor, the attribute value information by autonomously altering attribute value information logically associated with a known upgraded user included in the user population. Forming the initial data set including at least the training data subset from the user population may include: forming, by the at least one front-end system processor the initial data set from the user population, the initial data set including at least the training data subset that includes digital data representative of attribute value information logically associated with each of the number of known upgraded users, with each of the number of known non-upgraded users, and with each of a number of front-end system generated hypothetical upgraded users. The training method may further include: providing, by the at least one front-end system processor, at least a portion of the test data subset to a trained machine learning system; receiving, by the at least one front-end system processor, output data from the output layer of the trained machine learning system, the output data indicative of a probability that a particular user included in the test data subset will upgrade from a lower service level to a higher service level offered by a service provider based at least in part on the attribute value information logically associated with the particular user; forming, by the at least one front-end system processor, a logical association linking the output data received from the output layer of the trained machine learning system to the particular user; comparing, by the at least one front-end system processor, the received output data logically associated with the particular user with data indicative of whether the particular user is a known upgraded user or a known non-upgraded user; and assessing, by the at least one front-end system processor, at least one accuracy parameter associated with the trained machine learning system. The training method may further include: from time-to-time, autonomously reviewing, by the at least one front-end system processor, the user population to identify at least one of: known upgraded users or known non-upgraded users present in the user population; and autonomously updating, by the at least one front-end system processor, the training data subset to generate an updated training data subset and autonomously update the test data subset to generate an updated test data subset. The training method may further include: from time-to-time, autonomously providing, by the at least one front-end system processor, at least the updated training data subset to the input layer of the machine learning system to provide an updated, trained, machine learning system; from time-to-time, autonomously providing, by the at least one front-end system processor, at least the updated test data subset to the input layer of the updated, trained, machine learning system; receiving, by the at least one front-end system processor, output data from the output layer of the updated, trained, machine learning system, the output data indicative of a probability that a particular user included in the updated test data subset will upgrade from a lower service level to a higher service level offered by a service provider based at least in part on the attribute value information logically associated with the particular user; forming, by the at least one front-end system processor, a logical association linking the output data received from the output layer of the updated, trained, machine learning system to the particular user; comparing, by the at least one front-end system processor, the received output data logically associated with the particular user with data indicative of whether the particular user is a known upgraded user or a known non-upgraded user; and assessing, by the at least one front-end system processor, at least one accuracy parameter associated with the updated, trained, machine learning system. Assessing at least one accuracy parameter associated with the trained machine learning subsystem may include: autonomously comparing, by the at least one front-end system processor, the accuracy of the trained machine learning system with one or more defined accuracy threshold values; and rejecting, by the at least one front-end system processor, the updated user upgrade predictive model responsive to the accuracy of the updated user upgrade predictive model falling below the one or more defined accuracy threshold values. Providing the machine learning system with at least the training data subset as training examples may include: providing, by the at least one front-end system processor, the machine learning system with at least the training data subset as training examples, wherein the machine learning system includes a neural network; establishing connections within the neural network based at least in part on the attribute values logically associated with users included in the training data subset; and weighting the connections within the neural network based at least in part on the attribute values logically associated with users included in the training data subset. Weighting the connections within the neural network may include: weighting the connections within the neural network using back propagation. Providing the machine learning system with at least the training data subset as training examples may include: providing, by the at least one front-end system processor, at least the training data subset as training examples to the machine learning system, the machine learning system includes at least a boosted trees analysis or a random forests analysis. Providing the machine learning system with at least the training data subset as training examples may include: receiving, by the at least one front-end system processor, output data from the output layer of the machine learning system; determining, by the at least one front-end system processor, whether one or more training parameters indicative of one or more performance aspects of the machine learning system has plateaued; and terminating, by the at least one front-end system processor, the provision of the machine learning system with the training data subset in response to determining that the one or more training parameters has plateaued. Determining whether one or more training parameters indicative of one or more performance aspects of the machine learning system has plateaued may include: determining, by the at least one front-end system processor, whether a defined number of machine learning system training epochs has been reached; and responsive to determining that the defined number of machine learning system training epochs has been reached, terminating the provision of the training data subset, by the at least one front-end system processor, to the machine learning system.

An upgrade offer presentation system that identifies users likely to upgrade from a lower service level to a higher service level offered by a service provider and provides upgrade offers to candidate users identified as likely to upgrade may be summarized as including: at least one back-end, non-transitory, processor-readable, storage medium that stores processor-executable instructions; and at least one back-end system processor communicably coupled to an output layer of a machine learning system and to the at least one back-end, non-transitory, processor-readable, storage medium, the at least one back-end system processor to execute the processor-executable instructions and in response: receive output data from the output layer of the machine learning system, the output data including, for each of at least some users included in a user population, at least a value indicative of a likelihood that the respective user will from a lower service level to a higher service level offered by a service provider; assess the value indicative of the likelihood that the respective user will upgrade against at least one defined threshold value or at least one defined threshold value range; responsive to the receipt of the output data that includes at least a value assessed as meeting at least one defined threshold value or falling within at least one defined threshold value range, generate an upgrade offer for the respective user; and transmit the generated upgrade offer to the respective user.

The processor-executable instructions that cause the at least one back-end system processor to generate an upgrade offer for the respective user may further cause the at least one back-end system processor to: for each of the at least some of the users in the population of users: responsive to the receipt of the output data from output layer of the machine learning system that further includes information indicative of a future time at which the respective user is predicted to most likely upgrade, autonomously generate an upgrade offer for the respective user at the future time; and transmit the upgrade offer to the respective user at the future time. The processor-executable instructions that cause at least one back-end system processor to generate an upgrade offer for the respective user may further cause at least one back-end system processor to: for each of the at least some of the users in the population of users: responsive to the receipt of output data from the output layer of the machine learning system that further includes information indicative of a defined service level to which the respective user is predicted to most likely upgrade, autonomously generate an upgrade offer for the defined service level; and transmit the upgrade offer for the defined service level to the respective user. The upgrade offer presentation system may further include: a training system to train at least a machine learning system that identifies users likely to upgrade from a lower service level to a higher service level offered by a service provider, the system comprising: at least one front-end, non-transitory, processor-readable, storage medium that stores processor-executable instructions; and at least one front-end system processor communicably coupled to the at least one front-end, non-transitory, processor-readable, storage medium and to an input layer of the machine learning system, the at least one front-end system processor to execute the processor-executable instructions and in response: form an initial data set using data representative of a user population, the initial data set including at least: a training data subset that includes digital data representative of attribute value information logically associated with a number of known upgraded users and with a number of known non-upgraded users; and provide the machine learning system with at least the training data subset as training examples. The processor-executable instructions may further cause at least one front-end system processor to: receive input data indicative of one or more attribute values from each of the number of users in the user population; form a logical association linking the one or more received attribute values to the respective user; and store data indicative of the received attribute values and the logical association in a data structure in the at least one front-end, non-transitory, processor-readable, storage medium communicably coupled to the at least one front-end system processor. The processor-executable instructions that cause the at least one front-end system processor to form an initial data set including at least a training data subset using data representative of a user population, may further cause the at least one front-end system processor to: form the initial data set using data representative of a user population to further include a test data subset including digital data representative of attribute value information logically associated with a number of known upgraded users and digital data representative of attribute value information logically associated with a number of known non-upgraded users. The processor-executable instructions may further cause the at least one back-end processor to: autonomously transmit data indicative of known upgraded users present in the user population and data indicative of known non-upgraded users present in the user population to the at least one front-end processor; and wherein the processor-executable instructions may further cause the at least one front-end processor to: receive the data indicative of known upgraded users present in the user population and data indicative of known non-upgraded users present in the user population transmitted by the back-end processor; autonomously update the data representative of attribute values logically associated with the number of known upgraded users in the training data subset with the data indicative of at least some of the known upgraded users transmitted by the back-end processor;

autonomously update the data representative of attribute values logically associated with the number of known upgraded users in the test data subset with the data indicative of at least some of the known upgraded users transmitted by the back-end processor; autonomously update the data representative of attribute values logically associated with the number of known non-upgraded users in the training data subset with the data indicative of at least some of the known non-upgraded users transmitted by the back-end processor and autonomously update the data representative of attribute values logically associated with the number of known non-upgraded users in the test data subset with the data indicative of at least some of the known non-upgraded users transmitted by the back-end processor. A single system may include the front-end system and the back-end system.

A method of operating upgrade offer presentation system that identifies users likely to from a lower service level to a higher service level offered by a service provider and provides upgrade offers to candidate users identified as likely to upgrade may be summarized as including, by at least one back-end system processor, output data from a output layer of the machine learning system communicably coupled to the at least one back-end system processor, the output data including, for each of at least some users included in a user population, at least a value indicative of a likelihood that the respective user will from a lower service level to a higher service level offered by a service provider; assessing, by the at least one back-end system processor, the value indicative of the likelihood that the respective user will upgrade against at least one defined threshold value or at least one defined threshold value range; generating, by the at least one back-end system processor, an upgrade offer for the respective user responsive to the receiving of the output data that includes at least a value assessed as meeting at least one defined threshold value or falling within at least one defined threshold value range; and transmitting, by the at least one back-end system processor, the generated upgrade offer to the respective user.

Generating an upgrade offer for the respective user may include: autonomously generating an upgrade offer, by the at least one back-end system processor, for the respective user at a future time responsive to the receipt of the output data from the output layer of the machine learning system that includes information indicative of the future time at which the respective user is predicted to most likely upgrade; and wherein transmitting the generated upgrade offer to the respective user may include: transmitting, by the at least the upgrade offer to the respective user at the future time. Generating an upgrade offer for the respective user may include: autonomously generating an upgrade offer, by the at least one back-end processor, for a defined service level responsive to the receipt of output data from the output layer of the machine learning system that includes information indicative of a defined service level to which the respective user is predicted to most likely upgrade. The upgrade offer presentation method may further include: forming, by at least one front-end system processor communicably coupled to an input layer of the machine learning system, an initial data set using data representative of a user population, the initial data set including at least: a training data subset that includes digital data representative of attribute value information logically associated with a number of known upgraded users and with a number of users consisting of known non-upgraded users; and providing, by the at least one front-end system processor, at least the training data subset as training examples to the input layer of the machine learning system. The upgrade offer presentation method may further include: receiving, by at least one front end-system processor, input data indicative of one or more attribute values from each of the number of users in the user population; forming, by the at least one front-end system processor, a logical association linking the one or more received attribute values with the respective user; and storing, by the at least one front-end system processor, the received input data indicative of the attribute values and the logical association in a data structure in at least one front-end, non-transitory, processor-readable, storage medium communicably coupled to the at least one front-end system processor. Forming the initial data set including at least the training data subset, may include: forming, by the at least one front-end system processor, the initial data set using data representative of the user population to further include a test data subset including digital data representative of attribute value information logically associated with a number of known upgraded users and digital data representative of attribute value information logically associated with a number of known non-upgraded users. The upgrade offer presentation method may further include: autonomously transmitting, by the at least one back-end system processor, data indicative of known upgraded users present in the user population and data indicative of known non-upgraded users present in the user population to the at least one front-end processor; receiving, by the at least one front-end system processor, the data indicative of known upgraded users present in the user population and data indicative of known non-upgraded users present in the user population transmitted by the back-end processor; autonomously updating, by the at least one front-end system processor, the data representative of attribute values logically associated with the number of known upgraded users in the training data subset with the data indicative of at least some of the known upgraded users transmitted by the back-end processor; autonomously updating, by the at least one front-end system processor, the data representative of attribute values logically associated with the number of known upgraded users in the test data subset with the data indicative of at least some of the known upgraded users transmitted by the back-end processor; autonomously updating, by the at least one front-end system processor, the data representative of attribute values logically associated with the number of known non-upgraded users in the training data subset with the data indicative of at least some of the known non-upgraded users transmitted by the back-end processor and autonomously updating, by the at least one front-end system processor, the data representative of attribute values logically associated with the number of known non-upgraded users in the test data subset with the data indicative of at least some of the known non-upgraded users transmitted by the back-end processor.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. Operational level details of machine learning system, for example neural networks, and the organization and development of connections therein are known to those of skill in the art and are neither described nor shown in detail herein. Construction, specification and operational level details of standard electronic components such as processors, nontransitory memory, input/output interfaces, and wired and wireless networking are also known to those of skill in the art and are neither described nor shown in detail herein.

Unless the context requires otherwise, throughout the specification and claims which follow, the word "comprise" and variations thereof, such as "comprises" and "comprising," are to be construed in an open, inclusive sense that is as "including, but not limited to."

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise. Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings and Abstract of the Disclosure provided herein are for convenience only and do not interpret the scope or meaning of the embodiments.

For simplicity and ease of discussion, machine learning systems used in providing offers related to service levels to users of one or more services supplied by a service provider, for example via one or more Websites, are provided herein. Those of ordinary skill in the art will readily appreciate the applicability of the systems and methods disclosed herein to a wide variety of personal, commercial, and industrial settings where a number of service levels are available and identifying users that are likely to upgrade one or more levels of service is both advantageous and desirable.

Figure 1:
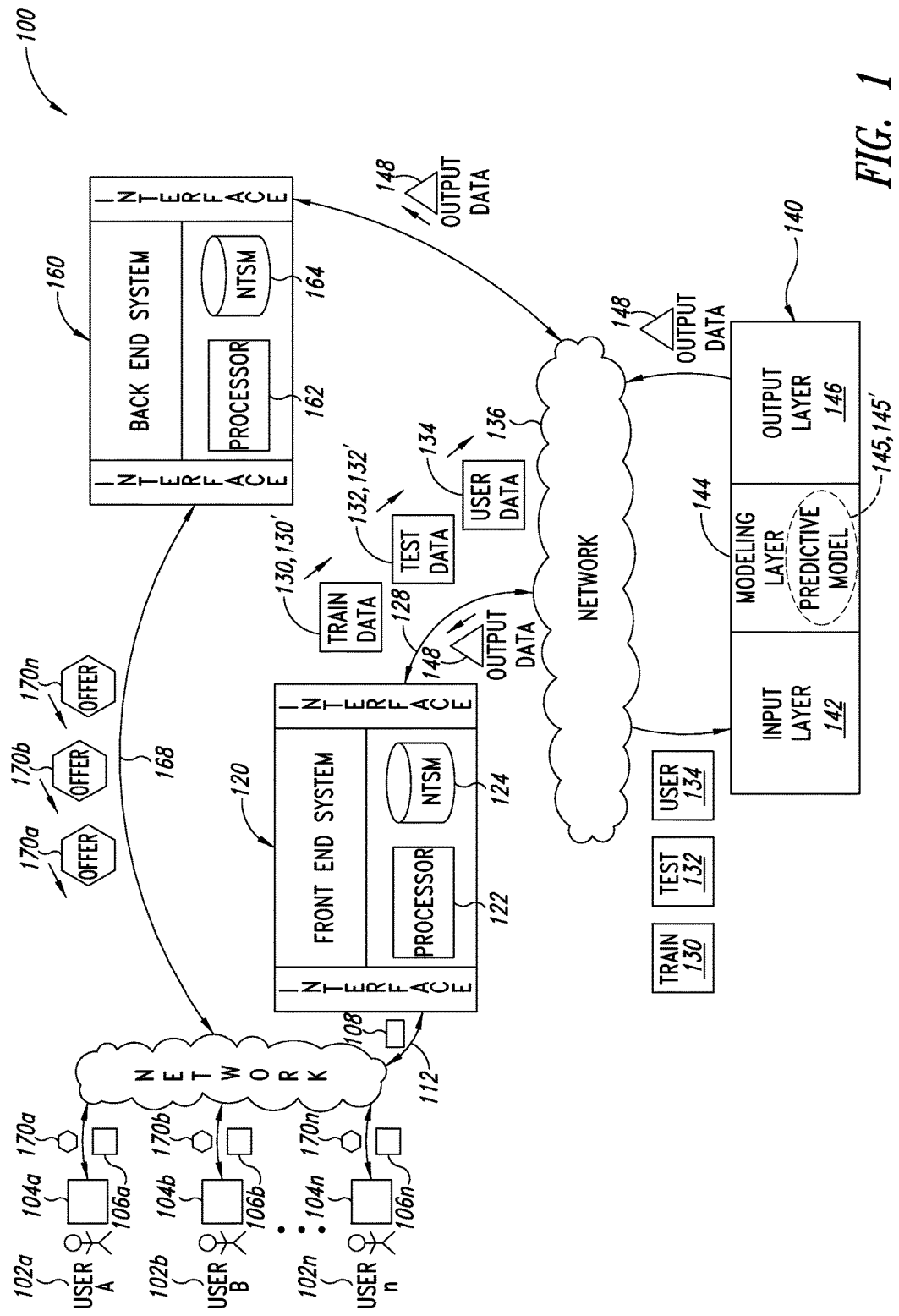
FIG. 1 is a schematic diagram illustrating an example upgrade offer presentation system that includes one or more machine learning systems communicably coupled to one or more front-end systems and one or more back end systems that generates and communicates upgrade offers to unclassified users who are determined likely to upgrade a level of service provided by a service provider, according to one non-limiting illustrated embodiment.

FIG. 1 shows an example upgrade offer presentation system 100 that includes a front-end system 120 which receives information about a number of users 102a-102n (collectively "users 102") communicably coupled to the front-end system 120 via a respective processor-based device 104a-104n (collectively, "processor-based device 104"). The users 102 form a total user population that includes known upgraded users, known non-upgraded users, and unclassified users who are neither known upgraded users nor known non-upgraded users. The front end system 120 accumulates, sorts, and/or organizes user attribute value data logically associated with each respective one of the users 102. In at least some instances, the front-end system 120 organizes user attribute value data into an initial data set that is then used to create a training data subset 130 and a test data subset 132. The front-end system 120 supplies at least the training data subset 130 to a machine learning system 140 via network 138. The machine learning system receives the training data subset 130 at an input layer 142.

Using the attribute value data included in the training data subset 130, the machine learning system 140 constructs a model in the modeling layer 144. The output data 148 generated by the modeling layer 144 is communicated to the output layer 146 of the machine learning system 140. The output data 148 includes at least data indicative of a value representative of a likelihood that a user will upgrade service levels.

One or more back-end systems 160 receive the output data from the output layer 146 of the machine learning system 140 via network 138. The back-end system 160 can compare the value indicative of the likelihood that a user 102 will upgrade service levels with one or more defined threshold values or threshold value ranges. If the back-end system 160 determines the value included in the output data 148 is indicative of a user likely to upgrade, the back-end system 160 may generate and communicate one or more upgrade offers 170a-170n (collectively, "upgrade offers 170") via network 110 to the processor-based device 104 of the respective user 102.

For example, a first unclassified user 102a may be associated with output data 148 that includes a value indicative of a user who may upgrade while a second unclassified user 102b may be associated with output data 148 that includes a value indicative of a user who will upgrade. In response to receiving the output data, the back-end system 160 may generate and communicate a discount upgrade offer to the first unclassified user 102a as an incentive to move the user "off the fence" and upgrade. In contrast, since the second unclassified user 102b is likely to upgrade on their own volition, the back-end system 160 may generate and communicate an upgrade offer to the second unclassified user 102b that includes a smaller or even no upgrade discount.

In some instances, after the machine learning system 140 is trained using one or more training data subsets 130, the front-end system 120 can supply one or more test data subsets 132 to the machine learning system 140 to assess the accuracy of the model constructed by the machine learning system 140. In such instances, the front-end system 120 can receive all or a portion of the output data 148 from the output layer of the machine learning system 140.

In at least some implementations, the front-end system 120 can include one or more media, service, or content delivery devices, for example one or more Webservers delivering content 108 associated with a relationship building service. The content 108, in the form of audio, video, or audio/video data may be delivered to any number of processor-based devices 104, each of which is associated with a respective user 102. The processor-based devices 104 can include any device suitable for receiving content 108 from the service provider such as a desktop computer, portable or laptop computer, smartphone, wearable computer or the like. Self-reported and autonomously collected user attribute value data 106a-106 (collectively "attribute value data 106") is communicated from each of the processor-based devices 104 to the front-end system 120.

User attribute value data 106 may be self-reported by the user 102 or may be autonomously collected from the user's processor-based device 104 by the front end system 120 or based on the user's 102 interaction with the service provider's Web servers and/or front-end system 120. The user attribute value data 106 may include user profile attribute values, user behavior attribute values or combinations thereof. Self-reported user profile attribute value data may correspond to user attributes such as a user's age, marital status, income, education level, geographic location, gender, ethnicity, profession and such. Such self-reported user profile attribute data may be obtained, for example, by requesting the user 102 complete a registration form or similar prior to the front-end system 120 providing content 108 to the user's processor-based device 104. Autonomously collected user profile attribute value data may correspond to user attributes such as a user's Internet service provider (ISP), media access control (MAC) address, Internet protocol (IP address), and such. Such autonomously collected user profile attribute data may be obtained from communication and/or data packets exchanged between the user's processor based device 104 and the front-end system 120.

The user attribute value data 106 may include a number of user behavior attribute values in addition to or instead of user profile attribute values. User behavior attribute values may be determined, in some instances, by the user's processor-based device 104 and in other instances by at least a portion of the front-end system 120. Generally, user behavior attribute values are autonomously collected by either the user's processor based device 104 or the front-end system 120, however self-reported user behavior attribute values (e.g., user behaviors external to interactions with the front end system 120) may be collected or otherwise obtained. Autonomously collected user behavior attribute value data may correspond to user attributes such as: the number, content, and/or length of electronic communications received, the number, content, and/or length of electronic communications transmitted, the average elapsed time to respond to a received electronic communication, profile attribute values shared by other users to whom the user has responded, and such.

At least one front-end system processor 122 logically associates the collected user attribute value data 106 with the respective user 102 and store data indicative of the attribute value data 106, the user 102, and the logical association linking the attribute value data 106 to the user 102 in a data store, database, or similar data storage structure that resides in the front-end system 120 non-transitory storage media 124. Such user data 134 forms the initial data set that can be considered to represent the total user population which includes, in many instances, substantially all of the users of one or more services provided by the service provider via the front end system 120. From time-to-time users 102 may be presented with upgrade offers from either the front-end system 120 or the back-end system 160. Users who accept the offer to upgrade service levels are designated as "known upgraded users" within the user population. Similarly, users who either express an explicit desire to not upgrade service levels, or who reject an upgrade offer offers from either the front-end system 120 or the back-end system 160 are designated as "known non-upgraded users" within the user population.

The at least one front-end system processor 122 can include any single or multi-cored controller or processor, including an application specific integrated circuit (ASIC); a reduced instruction set computer (RISC); a digital signal processor (DSP); a programmable logic controller (PLC); a microprocessor; or a microcontroller.

From time-to-time, the front-end system 120 scrapes or otherwise obtains attribute value data from the initial data set to generate at least one training data subset 130 and at least one test data subset 132. The front-end system 120 provides all or a portion of the training data subset to the input layer 142 of the machine learning system 140 to permit the construction of a predictive model 145 within the modeling layer 144. The training data subset 130 includes attribute value data logically associated with any number of known upgraded users and attribute value data logically associated with any number of known non-upgraded users.

The composition of the total user population is dynamic, with users joining, leaving, and upgrading (or downgrading) service levels on an ongoing basis. Thus, from time-to-time, the front-end system 120 can scrape data from the initial data set to create at least one updated training data subset 130. Periodically, or from time-to-time, the front-end system 120 can provide all or a portion of this at least one updated training data subset 130 to the input layer 142 of the machine learning system 140 to update the predictive model 145 used by the machine learning system 140. In at least some implementations, the provision of the updated training data subset 130 and the generation of an updated predictive model 145 may be executed as a background task by either or both the front-end system 120 and the machine learning system 140.

At times, the composition of the training data subset 130 may be representative of the initial data set used to form the training data subset 130. In other words, the percentage population of the known upgraded users and the percentage population of the known non-upgraded users in the training data subset 130 will closely parallel the percentage population of the known upgraded users and the percentage population of the known non-upgraded users in the initial data set.

At other times, the front-end system 120 may skew the composition of the training data subset 130 such that the composition of the training data subset 130 is not representative of the composition of the initial data set used to form the training data subset 130. In one example, the percentage population of the known upgraded users in the training data subset 130 may differ from (i.e., be greater than or less than) the percentage population of the known upgraded users in the initial data set.

At yet other times, it may be beneficial to weight one or more attribute values included in the training data subset 130 to favor the identification of unclassified users logically associated with such attribute values as users who are likely to upgrade service levels. In at least some implementations, the at least one front-end system processor 122 may either receive one or more inputs or autonomously identify one or more attributes and/or attribute values indicative of users who are most likely to upgrade service levels. In response to identifying these attributes and/or attribute values, the at least one front-end system processor 122 can generate one or more training data subsets 130 in which the percentage population of known upgrade users logically associated with the identified attribute values is greater than the percentage population of such known upgraded users in the total user population.

In some instances, the at least one front-end system processor 122 may generate any number of hypothetical known upgraded users, some or all of which may be included in the at least one training data subset 130. To create such hypothetical users, the at least one front-end system processor 122 may alter or adjust the attribute values logically associated with an actual known upgraded user to generate attribute values logically associated with the hypothetical known upgraded user. Inclusion of such processor generated hypothetical known upgraded users in the training data subset 130 may advantageously permit the generation of a predictive model 145 able to identify users likely to upgrade who have logically associated attribute value data that is close but not identical to attribute value data logically associated with actual known upgraded users, thereby increasing the number of users in the user population receiving upgrade offers.

The test data subset 132 also includes attribute value data logically associated with any number of known upgraded users and attribute value data logically associated with any number of known non-upgraded users. The composition of the test data subset 132 may be representative of the initial data set used to form the test data subset 132.

At times, the front-end system 120 provides all or a portion of the test data subset 132 to the input layer 142 of the machine learning system 140. Using the attribute value data logically associated with each user included in the test data subset 132, the predictive model 145 in the modeling layer 144 of the machine learning system 140 generates output data 148 that includes at least a value for each user indicative of the likelihood that the respective user will upgrade service levels. For at least some of the users included in the test data subset 132, this output data 148 is communicated from the output layer 146 of the machine learning system 140 to the front-end system 120. The front-end system 120 assesses the "likelihood of upgrading" value in the output data 148 for each user against whether the user is a known upgraded user or a known non-upgraded user to evaluate the accuracy of the predictive model 145 in the modeling layer 144.

In some instances, after updating the predictive model 145 using at least one updated training data subset 130, the front-end system 120 evaluates the accuracy of the updated predictive model 145 using all or a portion of at least one test data subset 132 or all or a portion of at least one updated test data subset scraped from the initial data set. In some instances, the front-end system 120 assesses the accuracy of the updated predictive model 145 against one or more defined threshold value limits and/or one or more defined threshold value ranges.

At times, service providers may wish to engage in advertising campaigns to identify those users who are likely to upgrade but may not have yet done so. Such advertising campaigns may range in size from relatively limited (i.e., focusing on a select user pool) to relatively broad (i.e., focusing on a large user pool). In some instances, the upgrade offer presented to a particular user 102a may be based in whole or in part on the likelihood that the particular user 102a will upgrade. For example, a user 102b who is less likely to upgrade may be provided an upgrade offer 170b at a lower cost or steeper discount as an incentive to encourage upgrading while a user 102c who is more likely to upgrade may be provided an upgrade offer 170c a higher cost or without discount since little incentive to upgrade service levels is needed. The machine learning system 140 provides the service provider with the ability to identify those users within the total user population who are likely to upgrade, and beneficially permits the assignment of a value corresponding to the likelihood that a particular user 102 will upgrade thereby permitting the delivery of targeted upgrade offers 170 individualized to the particular user.

At times, the machine learning system 140 may generate output values 148 that include data in addition to the value indicative of a likelihood that a particular user will upgrade service levels. For example, the machine learning system 140 may provide an output value 148 that includes data indicative of a time or temporal range over which the particular user will be most likely to upgrade. Such information is particularly advantageous in facilitating the delivery of upgrade offers to the particular user at the indicated time or during the temporal range. In another example, the machine learning system 140 may provide an output value 148 that includes data indicative of a service level to which the particular user is most likely to upgrade. Such information is particularly advantageous in facilitating the delivery of upgrade offers to the respective service level to which the particular user is most likely to upgrade.

Although the machine learning system 140 is depicted in FIG. 1 as including an input layer 142, a modeling layer 144, and an output layer 146, other machine learning system configurations are possible. The machine learning system 140 can include one or more predictive models 145, including neural networks, random forests, or boosted trees. Additionally, although the machine learning system 140 is depicted in FIG. 1 as separate from the front-end system 120 and the back-end system 160, all or a portion of the machine learning system 140 may be incorporated into either the front-end system 120 or the back-end system 160.

In one implementation, the machine learning system 140 can include a predictive model 145 including one or more neural networks within the modeling layer 144. Connections within the one or more neural networks are formed and/or re-formed using at least in part, the attribute value data associated with the known upgraded users and known non-upgraded users included in the training data subset 130. Connection weights within the one or more neural networks are established or re-established using at least in part, the attribute value data associated with the known upgraded users and known non-upgraded users included in the training data subset 130. In some implementations, the front-end system 120 provides the training data subset 130 to the input layer of the machine learning system until output data 148 received from the output layer 146 of the machine learning system 140 indicates one or more performance aspects of the machine learning system has plateaued. In some implementations, the front-end system 120 determines whether the one or more performance aspects have plateaued based at least in part on whether a defined number of machine learning system training epochs have been reached.

In run-time operation, the front-end system 120 provides user data 134 to the machine learning system 140. User data 134 includes profile and/or behavior attribute value data logically associated with unclassified users 102 who are neither a known upgraded user nor a known non-upgraded user. User data 134 may be provided from the front-end system 120 to the machine learning system 140 on a continuous, intermittent, periodic, or time-to-time basis.

Once trained, the machine learning system 140 provides an accurate and reliable indication of at least a likelihood that a particular user will upgrade service levels based on profile and/or behavior attribute value data logically associated with the particular user. Even more advantageously, by updating the predictive model 145 from time-to-time with current known upgraded and non-upgraded user attribute value data, trends in user upgrades may be identified and appropriate upgrade offers generated and autonomously communicated to users within the user population having comparable profile and/or behavior attribute values.

The output layer 146 of the machine learning system 140 receives output data 148 from the modeling layer 144. At times, the output data 148 is communicated to the front-end system 120, for example when training the machine learning system 140. At other times, the output data is communicated to the back-end system 160, for example during run-time operation of the machine learning system 140.

The back-end system 160 can be separate, partially included, or completely included within the front-end system 120. In other words, in some instances, although described herein in the context of different, discrete, devices, the front-end system processor 122 may be the same as the back-end system processor 162. Similarly, although described herein in the context of different, discrete, devices, the front-end non-transitory storage media 124 may be the same as the back-end non-transitory storage media 164. The back-end system 160 receives output data 148 from the output layer 146 of the machine learning system 140. The output data 148 includes at least one value indicative of the likelihood that a user 102 will upgrade service levels. Additionally, the output data 148 may include other values indicative of various aspects of the upgrade process. For example, the output data 148 may include data or values indicative of the time or temporal interval when a particular user 102a is most likely to upgrade. In another example, the output data 148 may include data or values indicative of the service level to which a particular user 102a is most likely to upgrade or even a trigger that is likely to provoke an upgrade.

The back-end system 160 receives the output data 148 and assesses the values included in the output data against one or more threshold values and/or one or more threshold value ranges to determine a likelihood that a particular user 102a will upgrade. Responsive to a determination that a particular user 102a or group of users 102a-102n are likely to upgrade service levels, at least one back-end system processor 162 generates upgrade offers 170a-170n (collectively "upgrade offers 170") for communication 168 to each respective user's processor-based device 104 via network 110.

The at least one back-end system processor 162 can include any single or multi-cored controller or processor, including an application specific integrated circuit (ASIC); a reduced instruction set computer (RISC); a digital signal processor (DSP); a programmable logic controller (PLC); a microprocessor; or a microcontroller.

Where the output data 148 includes values indicative of the time or temporal period when a particular user 102a is most likely to upgrade, the at least one back-end system processor 162 may generate and timely communicate the upgrade offer 170a to the particular user 102a at the identified time or during the identified time period. Where the output data 148 includes values indicative of the service level to which a particular user 102a is most likely to upgrade, the at least one back-end system processor 162 may generate an upgrade offer directed to the identified service level for communication to the particular user 102a as a trigger to induce the particular user 102a to upgrade.

Figure 2A:
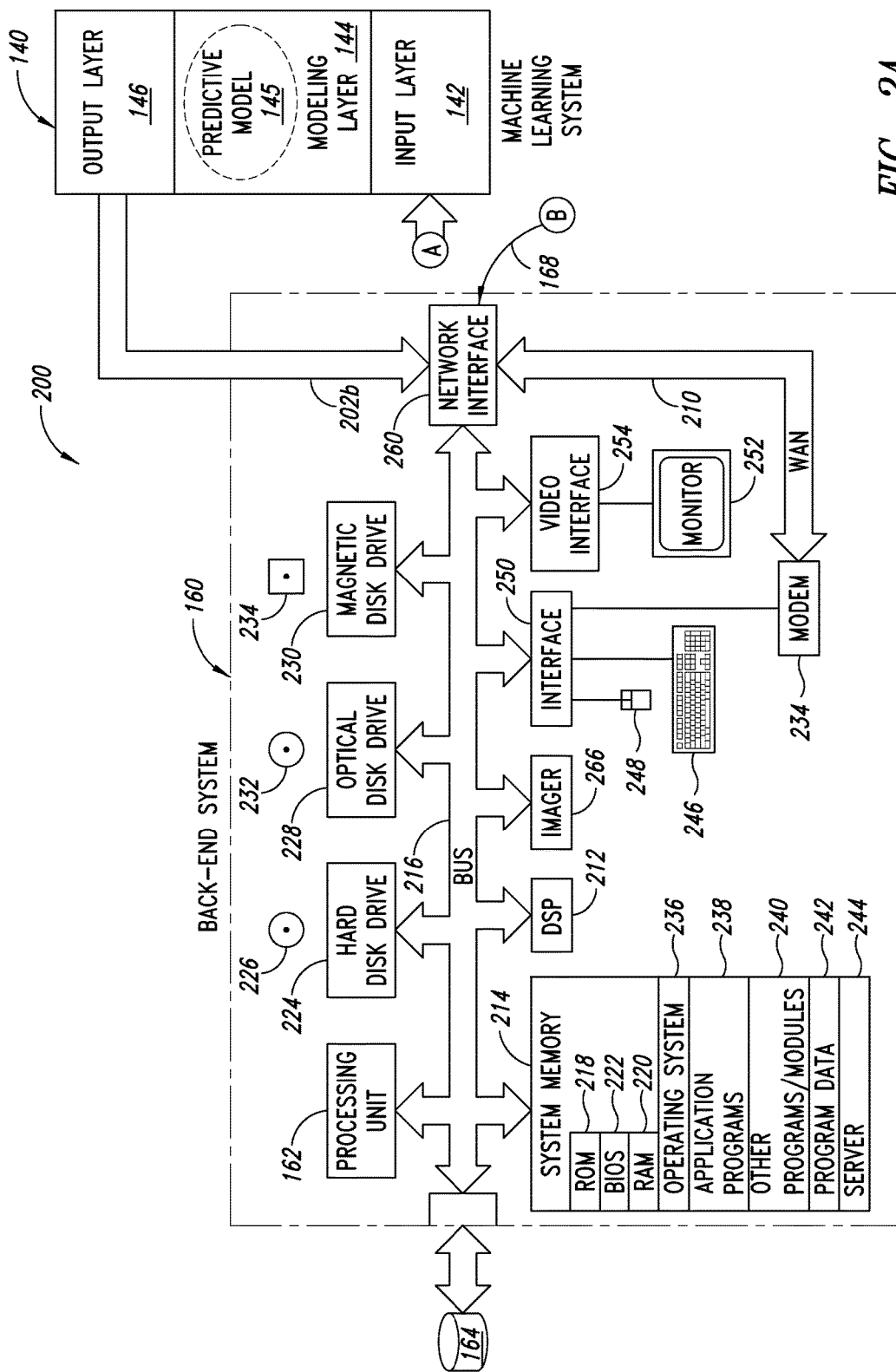
FIGS. 2A and 2B are schematic diagrams illustrating an example front-end system and an example back-end system, both communicably coupled to a machine learning system, according to one non-limiting illustrated embodiment.
Figure 2B:
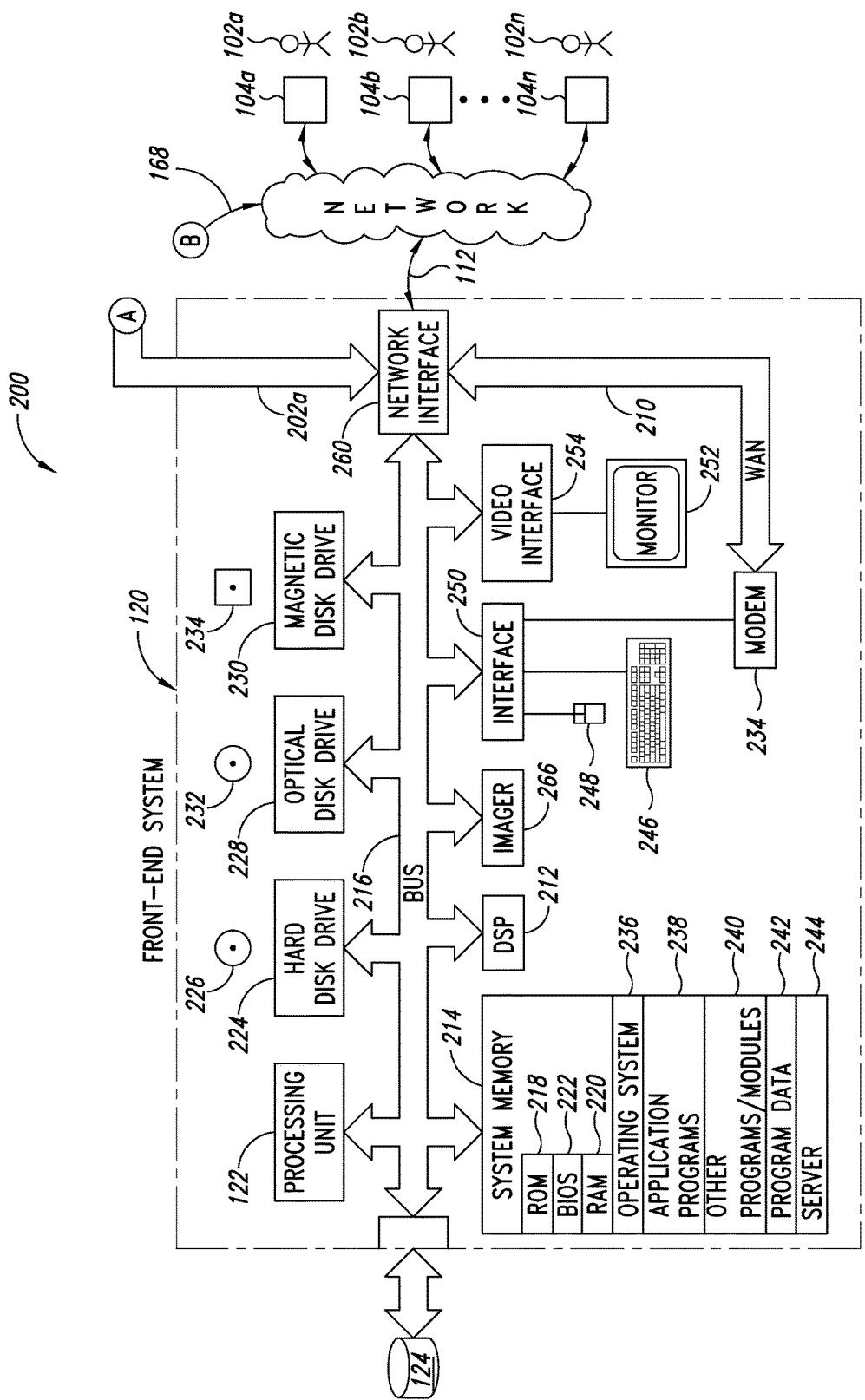

FIGS. 2A and 2B and the following discussion provide a brief, general description of a suitable networked user upgrade predictive system environment 200 in which the various illustrated embodiments can be implemented. For clarity and conciseness, the front-end system 120 and the back-end system 160 are depicted having identical architecture in FIGS. 2A and 2B. Although depicted as identical, the front-end system 120 and the back-end system 160 may have differing architectures that are capable of functioning as described herein to provide the user upgrade predictive system described in detail herein. Since the architectures are identical, the description of the various components included in the front-end system 120 and the back end system 160 share common numerical designators with an "a" suffix designating, where needed, a component in the front-end system 120 and a "b" suffix designating, where needed, a component included in the back-end system 160. Thus, for example, hard drive 224a would refer to the front-end system hard drive while "hard drive 224b" would refer to the back-end system hard drive.

Although not required, the embodiments will be described in the general context of computer-executable instructions, such as program application modules, objects, or macros stored on computer- or processor-readable media and executed by a computer or processor. Those skilled in the relevant art will appreciate that the illustrated embodiments, as well as other embodiments, can be practiced with other system configurations and/or other computing system configurations, including hand-held devices, multiprocessor systems, microprocessor-based or programmable consumer electronics, personal computers ("PCs"), networked PCs, mini computers, mainframe computers, and the like. The embodiments can be practiced in distributed computing environments where tasks or modules are performed by remote processing devices, which are linked through a communications network. In a distributed computing environment, program modules may be located in both local and remote memory storage devices or media.

FIGS. 2A and 2B show a networked user upgrade predictive system environment 200 comprising a front-end system 120 communicably coupled to the input layer 142 of a machine learning system 140 and a back-end system 160 communicably coupled to the output layer 146 of the machine learning system 140. In contrast to the networked components depicted in FIG. 1, in FIGS. 2A and 2B, the front-end system 120 communicably couples to the machine learning system 140 via communications bus 202a and the back-end system 160 communicably couples to the machine learning system 140 via communications bus 202b. The communications bus 202 may include one or more backplane buses, parallel cables, serial cables, or any other current or future developed tethered or wireless channels capable of high speed communications, for instance via Firewire®, IEEE 802.11, Thunderbolt®, or such.

Although not depicted in FIG. 2A or 2B, the networked user upgrade predictive system environment 200 may employ other computer systems and network equipment, for example additional servers, proxy servers, firewalls, routers and/or bridges. The front-end system 120 and the back-end system 160 will at times be referred to in the singular herein, but this is not intended to limit the embodiments to a single device since in typical embodiments there may be more than one front-end system 120 and/or more than one back-end system 160 involved. Unless described otherwise, the construction and operation of the various blocks shown in FIGS. 2A and 2B are of conventional design. As a result, such blocks need not be described in further detail herein, as they will be understood by those skilled in the relevant art.

The front-end system 120 can include at least one front-end system processor 122 and at least one communicably coupled front-end system non-transitory storage medium 124. The back-end system 160 can include at least one back-end system processor 162 and at least one communicably coupled back-end system non-transitory storage medium 164.

The front-end system 120 and the back-end system 160 may each include a system memory 214 and a system bus 216 that couples various system components including the system memory 214 and the processors 122, 162, respectively. The at least one front-end processor 122 and the at least one back-end processor 162 may include any type or number of logic processing units, such as one or more central processing units (CPUs), digital signal processors (DSPs) 212, application-specific integrated circuits (ASICs), field programmable gate arrays (FPGAs), etc. The system bus 216 can employ any known bus structures or architectures, including a memory bus with memory controller, a peripheral bus, and/or a local bus. The system memory 214 includes read-only memory ("ROM") 218 and random access memory ("RAM") 220. A basic input/output system ("BIOS") 222, which can form part of the ROM 218, contains basic routines that help transfer information between elements within the front-end system 120 and the back-end system 160, such as during start-up.

The front-end system 120 and the back-end system 160 may each include a hard disk drive 224 for reading from and writing to a hard disk 226, an optical disk drive 228 for reading from and writing to removable optical disks 232, and/or a magnetic disk drive 230 for reading from and writing to magnetic disks 234. The optical disk 232 can be a CD-ROM, while the magnetic disk 234 can be a magnetic floppy disk or diskette. The hard disk drive 224, optical disk drive 228 and magnetic disk drive 230 may communicate with the processing unit 212 via the system bus 216. The hard disk drive 224, optical disk drive 228 and magnetic disk drive 230 may include interfaces or controllers (not shown) coupled between such drives and the system bus 216, as is known by those skilled in the relevant art. The drives 224, 228 and 230, and their associated computer-readable media 226, 232, 234, provide nonvolatile storage of computer-readable instructions, data structures, program modules and other data for the front-end system 120 and the back-end system 160. Although the front-end system 120 and the back-end system 160 are illustrated as employing a hard disk 224, optical disk 228 and magnetic disk 230, those skilled in the relevant art will appreciate that other types of computer-readable media that can store data accessible by a computer may be employed, such as WORM drives, RAID drives, magnetic cassettes, flash memory cards, digital video disks ("DVD"), RAM, ROM, smart cards, etc.

Program modules can be stored in the system memory 214, such as an operating system 236, one or more application programs 238, other programs or modules 240 and program data 242. In some implementations, application programs 238*a* in the form of processor-readable instructions executable by the at least one front-end system processor 122, may include but are not limited to, instructions that cause the at least one front-end system processor 122 to:

i. facilitate communication (e.g., via a number of interactive and non-interactive Webpages) with the user processor-based devices 104*a*-104*n* ii. automatically store one or more initial data sets that include user attribute data values in a data store or database residing on the front-end system non-transitory storage medium 124;

iii. automatically scrape or otherwise obtain user attribute values logically associated with known upgraded users and known non-upgraded users from the one or more initial data sets;

iv. automatically generate attribute value data logically associated with hypothetical known upgraded users automatically generate training data subsets and test data subsets;

v. automatically scrape or otherwise obtain from time-to-time attribute value data from the initial data set to capture attribute values logically associated with new known upgraded users or new known non-upgraded users to generate updated training data subsets 130 and/or updated test data subsets;

vi. automatically supply training data subsets 130 to the machine learning system 140 to construct the prediction model 145;

vii. automatically supply updated training data subsets 130 to the machine learning system 140 to provide an updated prediction model 145;

viii. automatically supply test data subsets and/or updated test data subsets to the machine learning system 140 to assess one or more accuracy parameters of the prediction model 145 and/or updated prediction model 145 using output data 148 provided at the output layer 146 of the machine learning system 140; and ix. automatically supply attribute value data logically associated with users who are neither known upgraded users or known non-upgraded users (i.e., user data 134) to the machine learning system 140.

In some implementations, application programs 238*b* in the form of processor-readable instructions executable by the at least one back-end system processor 162, may include but are not limited to, instructions that cause the at least one back-end system processor 162 to:

i. automatically assess output data 148 received from the output layer 146 of the machine learning system 140 to identify those users 102*a*-102*n* in a user population who are likely to upgrade service levels;

ii. automatically assess output data 148 received from the output layer 146 of the machine learning system 140 to identify a time or a temporal range during which a particular user 102*a* is most likely to upgrade service levels;

iii. automatically assess output data 148 received from the output layer 146 of the machine learning system 140 to an identified service level to which a particular user 102*a* is most likely to upgrade;

iv. automatically generate and communicate upgrade offers 170 to a user 102 and/or group of users 102*a*-102*n* based at least in part on the output data 148 received from the machine learning system 140 as a trigger to induce the user 102 and/or the group of users 102*a*-102*n* to upgrade service levels, such may be particularly effective in inducing users 102 who are somewhat noncommittal about upgrading (e.g., users 102 who are "sitting on the fence");

v. automatically generate and communicate an upgrade offer 170*a* to a particular user 102*a* at a time or during a temporal range identified as the most likely for the particular user to upgrade service levels (e.g., from a standard service level to a premium service level);

vi. automatically generate and communicate an upgrade offer 170a to a particular user 102a offering an upgrade to an identified service level to which the particular user 102a is most likely to upgrade;

vii. automatically generate and communicate an upgrade offer that may or may not include a discount upgrade offer 170a to a particular user 102a identified as highly likely to upgrade.

Application programs 238 may include processor-executable instructions related to routine functionality such as the automatic establishment, maintenance, and updating of information related to electronic or digital documents or files, as well as privileges, permissions or authorizations to perform various acts on such electronic or digital documents or files such as reading, modifying, annotating, importing, and/or deleting. Other program modules 240 may include instructions for handling security such as password or other access protection and communications encryption. The system memory 214 may also include communications programs, for example applications that cause the front-end system 120 to function as a Webserver to distribute Webpages 108 to the users 102a-102n. In at least some instances, such Webserver functionality is markup language based, such as Hypertext Markup Language (HTML), Extensible Markup Language (XML) or Wireless Markup Language (WML), and operates with markup languages that use syntactically delimited characters added to the data of a document to represent the structure of the document. A number of suitable severs may be commercially available such as those from Cisco, Hewlett-Packard, Apache, Mozilla, Google, Microsoft, and Apple.

While shown in FIGS. 2A and 2B as being stored in the system memory 214, the operating system 236, application programs 238, other programs/modules 240, program data 242 and browser 244 can be stored on the hard disk 226 of the hard disk drive 224, the optical disk 232 of the optical disk drive 228 and/or the magnetic disk 234 of the magnetic disk drive 230. An operator can enter commands and information into the front end system 120 and the back-end system 160 using one or more input devices such as a single or multi-point touch screen interface or keyboard 246 and/or a pointing device such as a mouse 248, and/or via a graphical user interface. Other input devices can include a microphone, joystick, game pad, tablet, scanner, etc. These and other input devices are communicably coupled to the system using an appropriate I/O interface 250 such as a serial port interface that couples to the system bus 216, although other interfaces such as a parallel port, a game port or a wireless interface or a universal serial bus ("USB") can be used. A monitor 252 or other display device is coupled to the system bus 216 via a video interface 254, such as a video adapter. The front end system 120 can include other output devices, such as speakers, printers, etc.

Communications between the front-end system 120, the back-end system 160, and the machine learning system 140 may be via a tethered and/or wireless network architecture, for instance tethered and wireless enterprise-wide computer networks, intranets, extranets, and/or the Internet. Other embodiments may include other types of communications networks including telecommunications networks, cellular networks, paging networks, and other mobile networks. There may be any variety of computers, switching devices, routers, bridges, firewalls and other devices in the communications paths between the front-end system 120, the machine learning system 140, and the back-end system 160.

Figure 3:
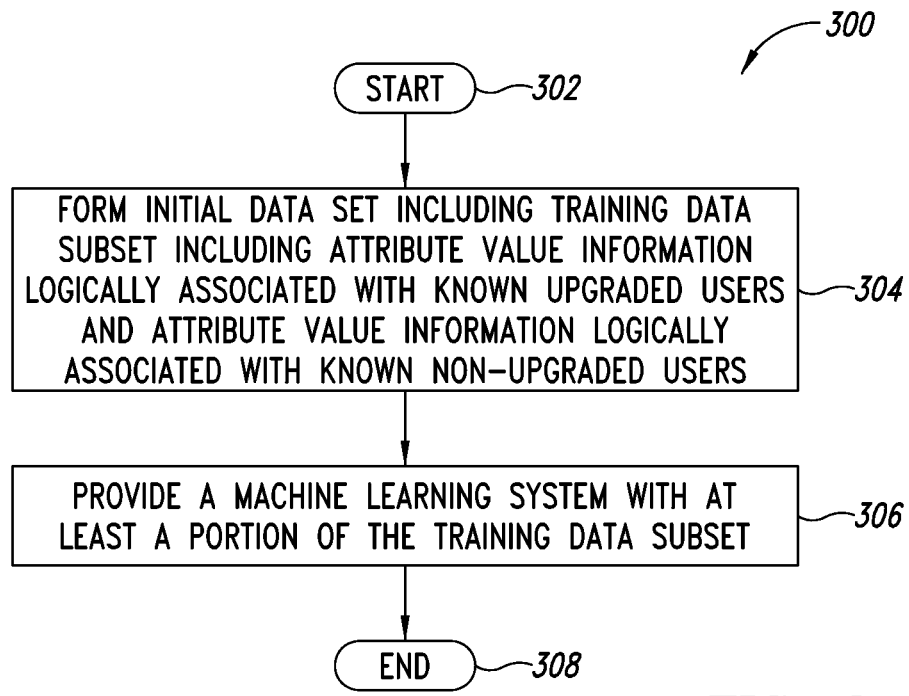
FIG. 3 is a high level flow diagram of an illustrative machine learning system training method that uses a training data subset including attribute value data logically associated with a number of known upgraded users and attribute value data logically associated with a number of known non-upgraded users, according to one non-limiting illustrated embodiment.

FIG. 3 shows a method 300 of training a machine learning system 140 to provide service level upgrade offers, according to one illustrated embodiment. Using profile and behavior attribute value data logically associated with each user 102a-102n, the front-end system 120 generates an initial data set. From the initial data set, the front-end system 120 generates and communicates a number of training data subsets 130 to the input layer 142 of the machine learning system 140. The training data subsets 130 include attribute value data logically associated with a number of known upgraded users and attribute value data logically associated with a number of known non-upgraded users. In some instances, the training data subset 130 may additionally include attribute value data logically associated with a number of hypothetical known upgraded users autonomously generated by the front-end system 120. Using the received training data subsets 130, the machine learning system 140 constructs one or more predictive models 145 in the modeling layer 144. The method 300 of providing a training data subset 130 from a front-end system 120 to a machine learning system 140 commences at 302.

At 304, the front-end system processor 122 forms a number of training data subsets 130, each of which includes attribute value information logically associated with a number of known upgraded users and attribute value information logically associated with a number of known non-upgraded users. The attribute value information includes attribute value information received or otherwise collected by the front-end system 120. The initial data set and each of the number of training data subsets 130 are stored, maintained, or otherwise retained in a data store or database at least partially resident on the front-end system non-transitory storage media 124. The at least one front-end system processor 122 autonomously scrapes, collects, skims, or otherwise obtains user attribute value information and groups and/or organizes the user attribute value information to generate the number of training data subsets 130.

Figure 4:
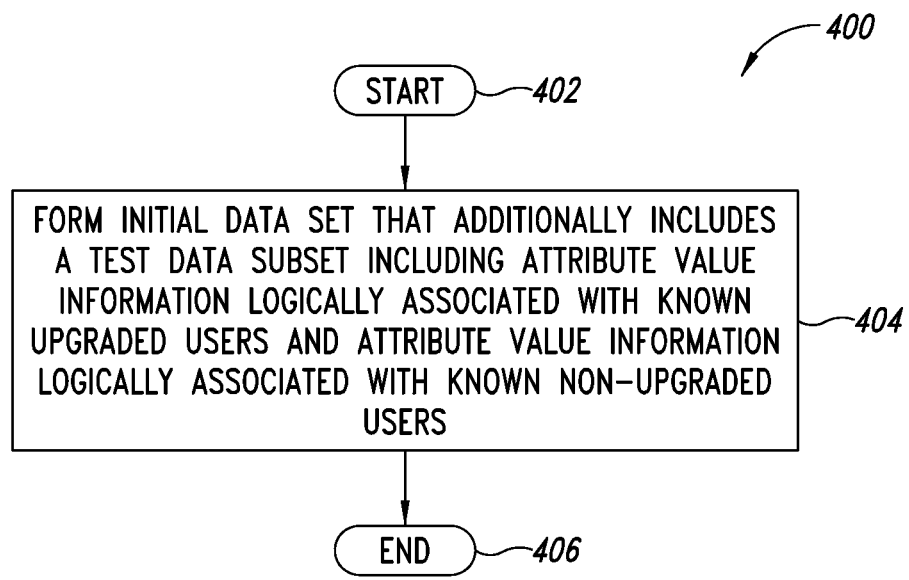
FIG. 4 is a high level flow diagram of an illustrative machine learning system training method using a test data subset that includes attribute value data logically associated with a number of known upgraded users and attribute value data logically associated with a number of known non-upgraded users, according to one non-limiting illustrated embodiment.

At 306, the front-end system 120 transmits, communicates, or otherwise provides the machine learning system 140 with all or a portion of the at least one training data subset 130. In implementations, the front-end system 120 may communicate the training data subset 130 as digital data to the input layer 142 of the machine learning system via one or more networks 136. In some instances, the front-end system 120 and the machine learning system 140 may be collocated and the digital data communicated via a tethered or wireless enterprise network 136 such as a tethered or wireless local area network (LAN) or a tethered or wireless wide area network (WAN). In some instances, the front-end system 120 and the machine learning system 140 may be located remote from each other and the digital data communicated via a network 136 such as a worldwide network or Internet. In yet other instances, all or a portion of the front-end system 120 and all or a portion of the machine learning system 140 may be included in a single system and the digital data representing the training data subset can be communicated via one or more buses or similar data communication structures within the system. The method 300 of providing a training data subset 130 from a front-end system 120 to a machine learning system 140 concludes at 308. FIG. 4 shows a method 400 of forming a test data subset 132 that includes attribute value information logically related to a number of known upgraded users and attribute value information logically related to a number of known non-upgraded users, according to one illustrated embodiment. In addition to generating a number of training data subsets 130 using the user attribute value information included in the initial data set, the front-end system 120 can also generate a number of test data subsets 132. At times, the front-end system 120 generates the test data subsets 132 by scraping, collecting, skimming, or otherwise extracting attribute value information from the total user population included in the initial data set. Each of the number of test data subsets 132 include digital data representative of attribute value information logically associated with a number of known upgraded users and a number of known non-upgraded users. The method 400 of forming a test data subset 132 commences at 402.

At 404, the front-end system processor 122 forms a number of test data subsets 132, each of which includes attribute value information logically associated with a number of known upgraded users and attribute value information logically associated with a number of known non-upgraded users. The attribute value information includes attribute value information received or otherwise collected by the front-end system 120. The initial data set and each of the number of test data sets 132 are stored, maintained, or otherwise retained in a data store or database at least partially resident on the front-end system non-transitory storage media 124. The at least one front-end system processor 122 autonomously scrapes or otherwise obtains user attribute value information and collects and/or organizes the attribute value information to generate the number of test data subsets 132. The method 400 of forming a test data subset 132 concludes at 406.

Figure 5:
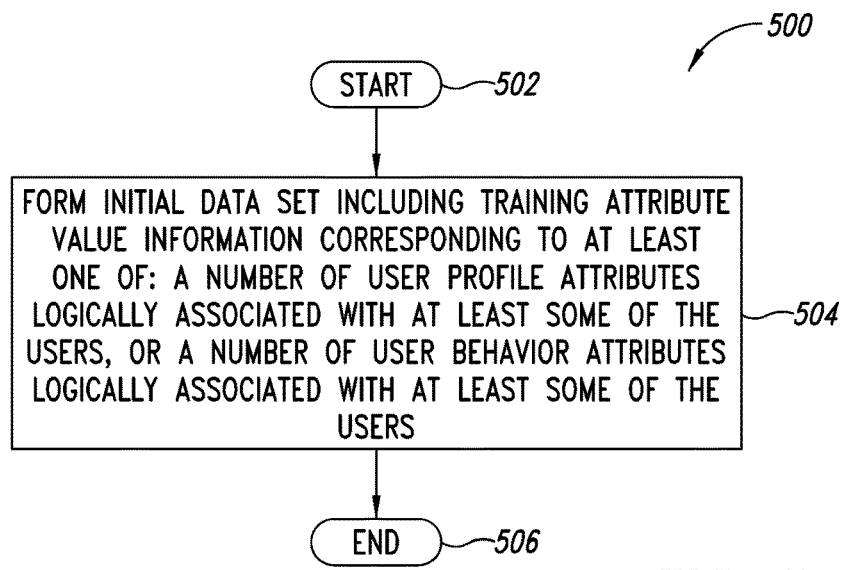
FIG. 5 is a high level flow diagram of an illustrative machine learning system training method using attribute value data that includes at least one of user profile attribute data or user behavior attribute data, according to one non-limiting illustrated embodiment.

FIG. 5 shows a method 500 of collecting by the front-end system 120 attribute value information that includes both user profile attribute value information and user behavior attribute value information, according to an illustrated embodiment. User attribute value information is takes many forms, and may include either or both user profile attribute value information and/or user behavior attribute value information.

User profile attributes may include user profile attribute values inherent to either the user 102 or the processor-based device(s) 104 that are logically associated with the respective user 102 by the front-end system 120. Example user profile attributes logically associated with the respective user 102 may include, but are not limited to, attribute values representative of a user's: height, age, income, education, occupation, marital status, geographic location, and similar. Example user profile attributes logically associated with the respective user's processor-based device(s) 104 may include, but are not limited to, include attribute values representative of the processor-based device's: Internet Service Provider (ISP), Internet protocol (IP) address, browser type, Media Access Code (MAC) address, operating system (O/S) type, computing platform, and similar.

User behavior attributes may include user behavior attribute values specific to either the user 102 or the processor-based device(s) 104. The front-end system 120 logically associates user behavior attributes with the respective user 102. Example user behavior attributes logically associated with the respective user 102 may include, but are not limited to, attribute values representative of a user's: number of inbound electronic communications (e.g., e-mail), number of outbound electronic communications, average time to respond to inbound electronic communications, outbound electronic communication format, outbound electronic communication recipient profile attributes, and the like. Example user behavior attributes logically associated with the respective user's processor-based device(s) 104 may include, but are not limited to, include attribute values representative of: cookies, browser history, last Website visited, and similar, collected by the user's processor-based device 104. The method of collecting attribute value information that includes both user profile attribute value information and user behavior attribute value information by the front-end system 120 commences at 502.

At 504, the front-end system processor 122 forms an initial data set that includes attribute value information logically associated with some or all respective users included in a user population. Such attribute value information provides information relevant to making a determination of whether to present a service upgrade offer 170 to a respective user 102 identified as likely to upgrade, or to not present a service upgrade offer 170 to a respective user 102 that has been identified as unlikely to upgrade.

The initial data set generated by the at least one front-end system processor 122 includes attribute value information related to a respective user's profile attributes and may include attribute value information related to a respective user's behavior attributes. In some instances, user profile and behavior attribute value information may be collected as self-reported information by the respective user 102. For example, such information may be collected as part of an initial user registration and account set-up by process implemented by the service provider. In some instances, all or a portion of the user profile and behavior information may be autonomously collected by the front-end system 120 from either data received by the front-end system 120 or data on the user's processor-based device 104 that is accessible to the front-end system 120. The method of collecting by the front-end system 120 attribute value information that includes both user profile attribute value information and user behavior attribute value information concludes at 506.

Figure 6:
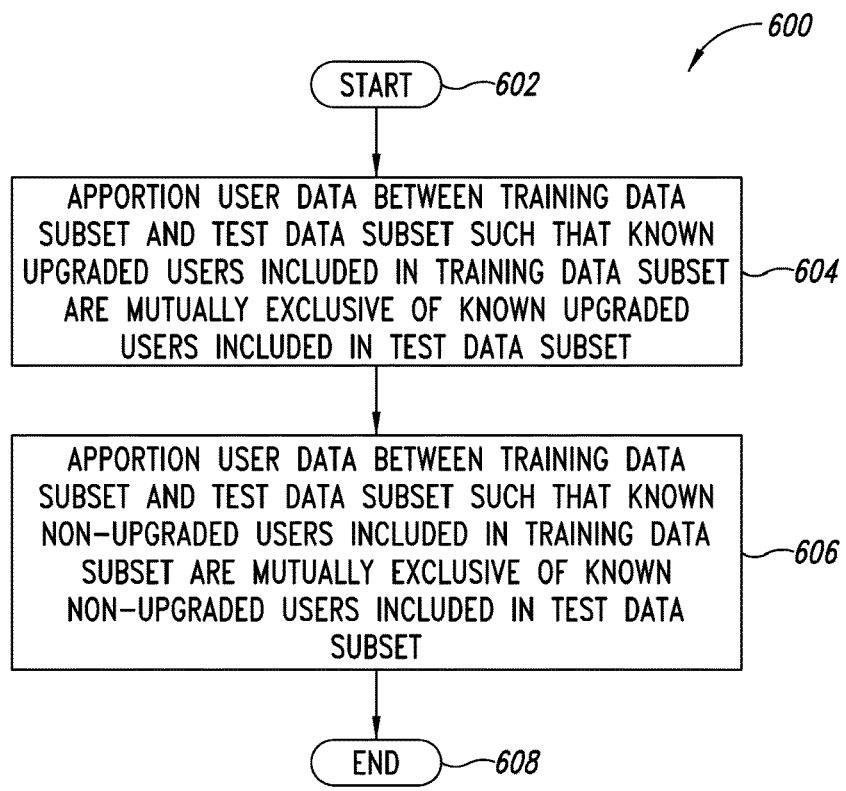
FIG. 6 is a high level flow diagram of an illustrative machine learning system training method in which the user attribute value data used in constructing the training data subset is mutually exclusive of the user attribute value data used in constructing the test data subset, according to one non-limiting illustrated embodiment.

FIG. 6 shows a method 600 of creating a number of training data subsets 130 and a number of test data subsets 132 in which users 102 logically associated with attribute value information included in the training data subset(s) 130 are mutually exclusive of users 102 logically associated with attribute value information included in the test data subset(s) 132. The method 600 of creating such mutually exclusive training data subset(s) 130 and test data subset(s) 132 commences at 602.

At 604, the at least one front-end system processor 122 apportions at least a portion of the attribute value information included in the initial data set and logically associated with known upgraded users included in the total user population into a number of training data subsets 130 and a number of test data subsets 132. The at least one front-end system processor 122 excludes users 102 logically associated with the attribute value information included in one or more of the training data subsets 130 from inclusion in any of the test data subsets 132.

At 606, the at least one front-end system processor 122 apportions at least a portion of the attribute value information included in the initial data set and logically associated with known non-upgraded users included in the total user population into a number of training data subsets 130 and a number of test data subsets 132. The at least one front-end system processor 122 excludes users 102 logically associated with the attribute value information included in one or more of the training data subsets 130 from inclusion in any of the test data subsets 132. The method 600 of creating such mutually exclusive training data subset(s) 130 and test data subset(s) 132 concludes at 608.

Figure 7:
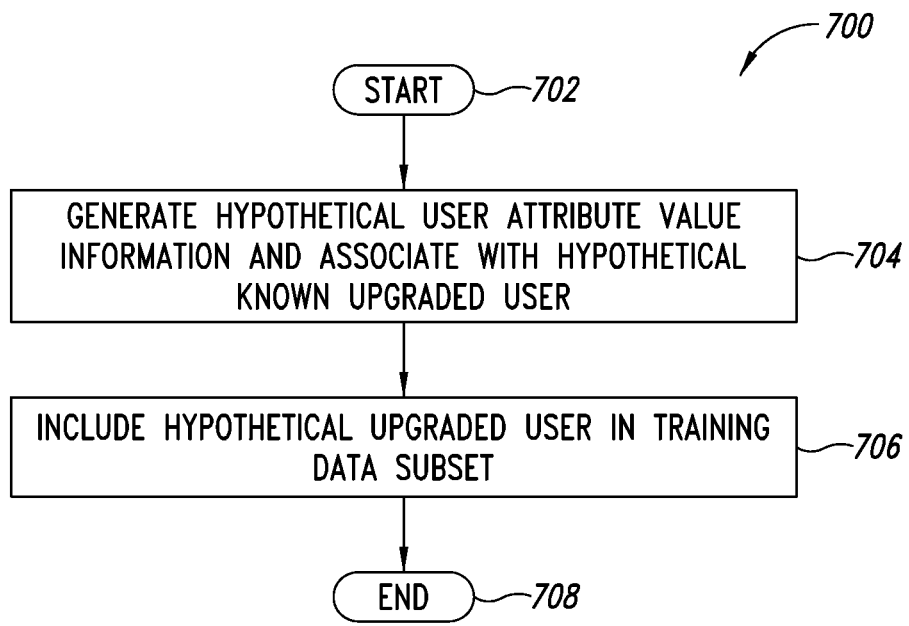
FIG. 7 is a high level flow diagram of an illustrative machine learning system training method in which a front-end system generates hypothetical user attribute value data for inclusion in the training data subset by altering or adjusting the attribute value data logically associated with one or more known upgraded users, according to one non-limiting illustrated embodiment.

FIG. 7 shows a method 700 of generating, by the at least one front-end system processor 122, hypothetical attribute value information that is logically associated with a hypothetical known upgraded user, according to one illustrated embodiment. The predictive model 145 is constructed by the machine learning system 140 based at least in part on the attribute value information logically associated with the known upgraded users included in the training data subset 130. The use of only attribute value information logically associated with known upgraded users is useful for identifying those unclassified users (i.e., users who are classified as neither a known upgraded nor a known non-upgraded user) within a population. However, instances may exist where unclassified users who are interested in upgrading service levels and have attribute value information similar, but not identical, to other known upgraded users are overlooked by the predictive model 145. In an effort to identify these "similar but not identical" users as a "user likely to upgrade," the front-end system processor 122 can generate any number of hypothetical known upgraded users by slightly varying at least one of the attribute values logically associated with a known upgraded user included in the user population. The front-end system processor 122 then includes these generated hypothetical upgraded users in one or more of the number of training data subsets 132 to "broaden" the attribute value ranges logically associated with users identified by the predictive model 145 as "likely to upgrade service levels." The method 700 of autonomously generating hypothetical user attribute value information and autonomously logically associating such hypothetical user attribute value information with a hypothetical known upgraded user that is included in one or more training data subsets commences at 702.

At 704, the at least one front-end system processor 122 generates hypothetical attribute value information and logically associates the generated information with a hypothetical known upgraded user. In one implementation, the at least one front-end system processor 122 autonomously selects one or more attribute values logically associated with a known upgraded user included in the user population. The at least one front-end system processor 122 then alters, adjusts, or changes the selected attribute value thereby generating a hypothetical attribute value. The at least one front-end system processor 122 then logically associates this system generated hypothetical attribute value with a hypothetical user. Generally, although varied, altered, or adjusted attribute values from multiple known upgraded users may be combined in one system generated hypothetical known upgraded user, each system generated hypothetical known upgraded user is generated using one or more varied, altered, or adjusted attribute values logically associated with one known upgraded user.

For example, the front-end system processor may select an attribute value ("35") corresponding to the attribute "user age" logically associated with a known upgraded user. The at least one front-end system processor 122 varies this attribute value within a defined range (e.g., +1-2) to generate a hypothetical attribute value of "36" which is then logically associated with a system generated hypothetical known upgraded user.

At 706, the at least one front-end system processor 122 includes one or more hypothetical known upgraded users in at least some of the number of training data subsets 130. The method 700 of autonomously generating hypothetical user attribute value information and autonomously logically associating such hypothetical user attribute value information with a hypothetical known upgraded user that is included in one or more training data subsets concludes at 702.

Figure 8:
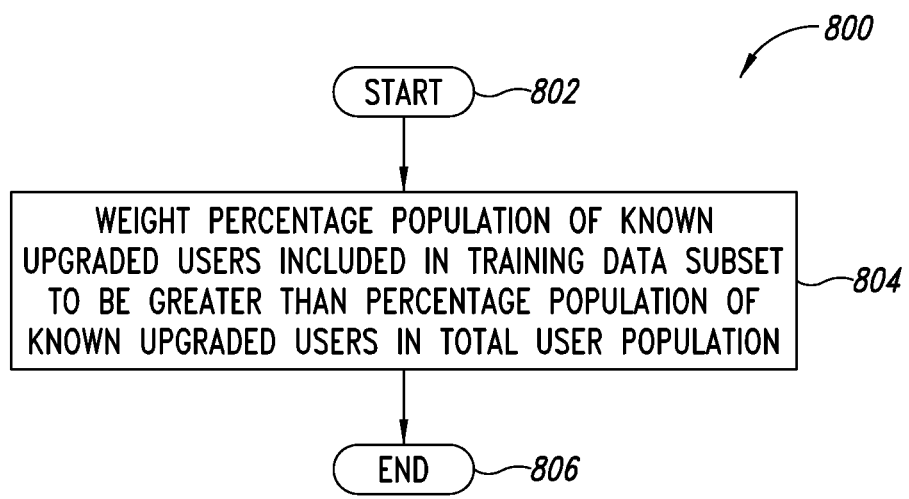
FIG. 8 is a high level flow diagram of an illustrative machine learning system training method in which the front-end system generates a training data subset in which the percentage population of known upgraded users is greater than the percentage population of known upgraded users in the total user population, according to one non-limiting illustrated embodiment.

FIG. 8 shows a method 800 of skewing or weighting the percentage population of one or more training data subsets 130 to favor the identification of one or more user attribute values as indicative of a user who is likely to upgrade service levels, according to one or more illustrated embodiments.

In some instances, the composition of some or all of the number of training data subsets 130 may be representative of the total user population. For example, the percentage population of known upgraded users included in some or all of the number of training data subsets 130 may be similar to the percentage population of known upgraded users included in the total user population. In other instances the composition of some or all of the training data subsets 130 may be different or non-representative of the total user population. For example, the percentage population of known upgraded users included in some or all of the training data subsets 130 may be greater than the percentage population of known upgraded users included in the total user population. Such skewed and/or weighted training data subsets may advantageously improve the accuracy of the predictive model 145 in determining the likelihood that a particular user 102a will upgrade service levels. The method 800 of skewing or weighting the percentage population of one or more training data subsets 130 to favor the identification of one or more user attribute values as indicative of a user who is likely to upgrade service levels commences at 802.

At 804, the at least one front-end system processor 122 includes in at least some of the training data subsets 130 known upgraded users having one or more identified attribute values at a percentage population different from the percentage population of users logically associated with the respective attribute values in the total user population. By emphasizing or deemphasizing various attribute values in the training data subset 130, the construction of the predictive model 145 in the machine learning system 140 is affected or altered to the extent that the output data 148 generated by the predictive model 145 is influenced by the training data supplied to the input layer 142 of the machine learning system 140 by the front-end system 120.

In some instances, the at least one front-end system processor 122 may manually or autonomously de-emphasize one or more known upgraded user attribute values by including a lower percentage population of users logically associated with the respective attribute values in some or all of the number of training data subsets 130 when compared to the percentage population of such known upgraded users in the total user population.

In some instances, the at least one front-end system processor 122 may manually or autonomously emphasize one or more known upgraded user attribute values by including a higher percentage population of users logically associated with the respective attribute values in some or all of the number of training data subsets 130 when compared to the percentage population of such known upgraded users in the total user population.

In yet other instances, the at least one front-end system processor 122 may manually or autonomously emphasize all known upgraded user attribute values by including a higher percentage population of known upgraded users associated with the respective attribute values in some or all of the number of training data subsets 130 when compared to the percentage population of known upgraded users in the total user population. The method 800 of skewing or weighting the percentage population of one or more training data subsets 130 to favor the identification of one or more user attribute values as indicative of a user who is likely to upgrade service levels concludes at 806.

Figure 9:
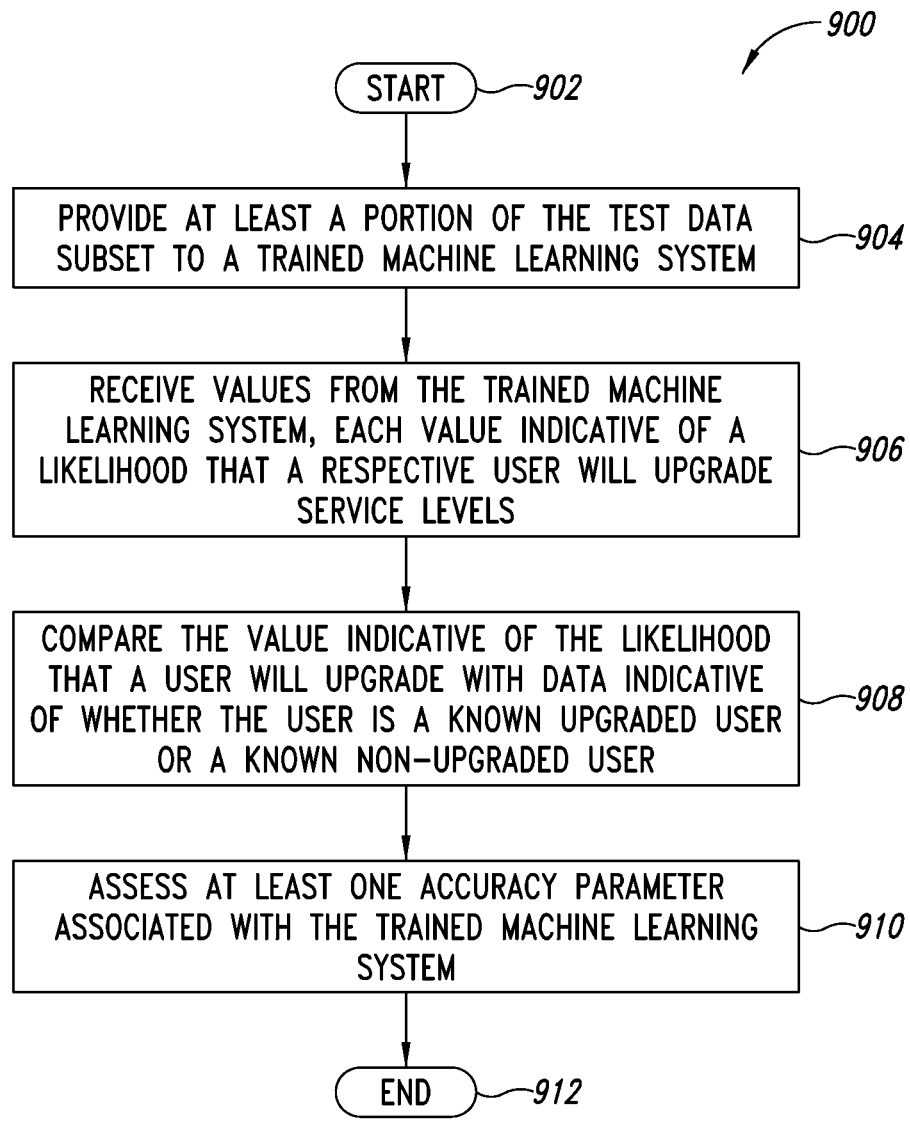
FIG. 9 is a high level flow diagram of an illustrative machine learning system training method in which a user attribute value data included in a test data subset is provided to the input layer of a trained machine learning system and the output data provided at the output layer of the machine learning system is compared with the known upgrade status to assess the accuracy of the model used by the trained machine learning system, according to one non-limiting illustrated embodiment.

FIG. 9 shows a method 900 of confirming the accuracy of a trained predictive model 145 in a machine learning system 140 by supplying a number of test data subsets 132 to the trained predictive model 145 and assessing the accuracy of at least a portion of the output data provided by the trained predictive model 145, according to an illustrated embodiment. The front-end system 120 provides a number of training data subsets 130 to the input layer of the machine learning system 140. The attribute value information included in the training data subsets permits the machine learning system to construct a predictive model 145 within the modeling layer 144. Prior to placing the predictive model 145 into run-time mode, the front-end system 120 may communicate all or a portion of a number of test data subsets 132 to the input layer 142. In some instances, during such machine learning system 140 test periods, the front-end system 120 receives at least a portion of the output data 148 from the machine learning system 140. By comparing the received output data 148 with data indicative of whether a particular user associated with the output data 148 was either a known upgraded user or a known non-upgraded user, the front-end system performs a qualitative assessment of the accuracy of the predictive model 145. By comparing one or more accuracy assessment parameters with defined threshold values, the front-end system 120 can determine whether the predictive model 145 is sufficiently accurate for use in run-time mode. In at least some instances, responsive to an assessment that the predictive model 145 is not sufficiently accurate for run-time operation, the front-end system 120 may autonomously supply additional training data subsets 130 to the machine learning system 140. The method 900 of confirming the accuracy of a trained predictive model 145 in a machine learning system 140 by supplying a number of test data subsets 132 to the trained predictive model 145 and assessing the accuracy of at least a portion of the output data provided by the trained predictive model 145 commences at 902.

At 904, the front-end system 120 supplies a number of test data subsets 132 to an input layer 142 of a machine learning system 140 that includes at least one trained predictive model 145. Each of the test data subsets 132 includes attribute value information logically associated with a number of known upgraded users and attribute value information logically associated with a number of known non-upgraded users. Responsive to the receipt of the test data subsets 132, the trained predictive model 145 in the machine learning system 140 generates for each user included in the test data subset 132 output data 148 that includes at least a value indicative of the likelihood that the respective user will upgrade service levels.

At 906, the front-end system 120 receives the output data 148 from the output layer 146 of the machine learning system 140.

At 908, the at least one front-end system processor 122 compares the value indicative of the likelihood that a user will upgrade service levels included in the output data with data indicative of whether the respective user is a known upgraded user or a known non-upgraded user.

At 910, the front-end system 120 assesses at least one accuracy parameter of the trained predictive model 145. In some instances, such an accuracy parameter may include assessing the output data value indicative of the likelihood that the user will upgrade service levels against data representative of whether the respective user is a known upgraded user or a known non-upgraded user. In some instances, such an accuracy parameter may include assessing a predictive model output data value indicative of the time or temporal range over which the user was most likely to upgrade against data indicative of when the respective user actually upgraded service levels. In yet other instances, such an accuracy parameter may include assessing a predictive model output data value indicative of the service level to which the user was most likely to upgrade against data indicative of the service level to which the respective user actually upgraded. The method 900 of confirming the accuracy of a trained predictive model 145 in a machine learning system 140 by supplying a number of test data subsets 132 to the trained predictive model 145 to test upgrade offer trigger conditions and assess the accuracy of at least a portion of the output data provided by the trained predictive model 145 concludes at 912.

Figure 10:
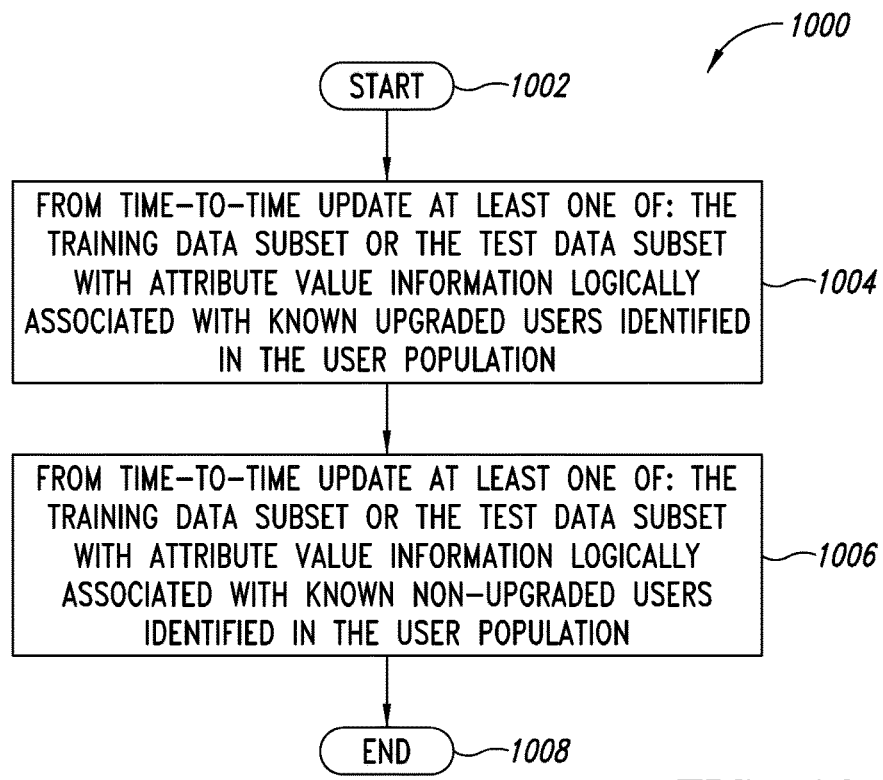
FIG. 10 is a high level flow diagram of an illustrative machine learning system training method in which, from time-to-time the attribute value data included in at least one of the training data subset or the test data subset is updated, according to one non-limiting illustrated embodiment.

FIG. 10 shows a method 1000 of autonomously updating from time-to-time, the attribute value information included in the training data subset 130 to provide an updated training data subset 130' and updating from time-to-time, the attribute value information included in the test data subset 132 to provide an updated test data subset 132', according to an illustrated embodiment. The user population is dynamic and changes over time. Unclassified users who elect to upgrade service levels may be subsequently classified as a known upgrade user, unclassified users who elect not to upgrade service levels may be subsequently classified as a known non-upgraded user, new users may join, and old users may depart. It is advantageous to track these population dynamics so that the impact of the changes in the total user population are reflected in the one or more predictive models 145 used by the machine learning system 140. The method 1000 of updating the training data subset and the test data subset commences at 1002.

At 1004, the at least one front-end system processor 122 autonomously updates some or all of the number of training data subsets 130 with attribute value information logically associated with users in the total user population who have been identified as known upgraded users by the front-end system 120 to provide a number of updated training data subsets 130'. At times, the at least one front-end system processor 122 may optionally autonomously update some or all of the number of test data subsets 132 with attribute value information logically associated with users in the total user population who have been identified as known upgraded users by the front-end system 120 to provide a number of updated test data subsets 132'. Such autonomous updating of the training data subsets 130 may be performed by the front-end system 120 on a regular basis (e.g., daily, weekly, bi-weekly), on an intermittent basis or at irregular intervals, upon occurrence of a defined event (e.g., for every 100 new users), or continuously (e.g., as a background task in the front-end system 120).

At times, the front-end system 120 may autonomously transmit or communicate 128 any number of updated training data subsets 130' to the input layer 142 of the machine learning system 140. Upon receipt of such updated training data subsets 130', the machine learning system 140 can update the predictive model 145 using the attribute value information included in the updated training data subset 130' to provide an updated, trained, predictive model 145'.

In some instances, the machine learning system 140 communicates, transmits, or broadcasts 128 the output data 148 generated by the updated, trained, predictive model 145' to the front-end system 120. Upon receipt of the output data 148 provided by the updated, trained, predictive model 145', the front-end system 120 assesses the accuracy of the output data 148. In some instances, if the assessed accuracy of the output data 148 provided by the updated, trained, predictive model 145' falls outside of acceptable limits, the front-end system 120 may autonomously reject the updated, trained predictive model 145'. Upon rejection of the updated, trained, predictive model 145' by the front-end system 120, the run-time machine learning system 140 continues to operate using the former trained predictive model 145.

At 1006, the at least one front-end system processor 122 may autonomously update some or all of the number of training data subsets 130 with attribute value information logically associated with users in the total user population who have been identified as known non-upgraded users by the front-end system 120 to provide a number of updated training data subsets 130'. At times, the at least one front-end system processor 122 may optionally autonomously update some or all of the number of test data subsets 132 with attribute value information logically associated with users in the total user population who have been identified as known non-upgraded users by the front-end system 120 to provide a number of updated test data subsets 132'. Such autonomous updating of the training data subsets 130 may be performed by the front-end system 120 on a regular basis (e.g., daily, weekly, bi-weekly), on an intermittent basis or at irregular intervals, upon occurrence of a defined event (e.g., for every 100 new users), or continuously (e.g., as a background task in the front-end system 120). The method 1000 of updating the training data subset and the test data subset concludes at 1008.

Figure 11:
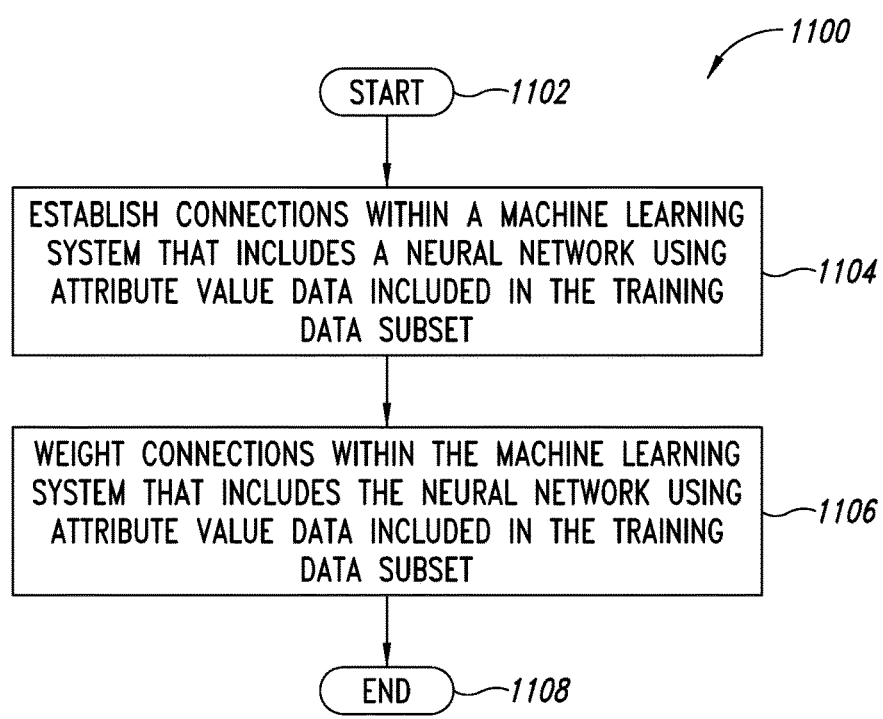
FIG. 11 is a high level flow diagram of an illustrative machine learning system training method that includes a neural network in which connections and connection weights are established using the training data subset supplied by the front-end system to the machine learning system, according to one non-limiting illustrated embodiment.

FIG. 11 shows a method 1100 of constructing a predictive model 145 that includes at least one neural network, according to an illustrated embodiment. The machine learning system 140 may construct any number of predictive models 145 and may, at times, construct more than one type of predictive model 145. For example, the machine learning system may, at times, construct one or more predictive models 145 using a boosted trees analysis method, using a random forests analysis method, or using a neural network. The method 1100 of training a neural network predictive model 145 commences at 1102.

At 1104, based at least in part on attribute value information included in one or more training data subsets 130 received at the input layer 142, the machine learning system 140 forms connections within a neural network predictive model 145.

At 1106, based at least in part on attribute value information included in one or more training data subsets 130 received at the input payer 142, the machine learning system 140 weights the connections within a neural network predictive model 145. The method 1100 of training a neural network predictive model 145 concludes at 1108.

Figure 12:
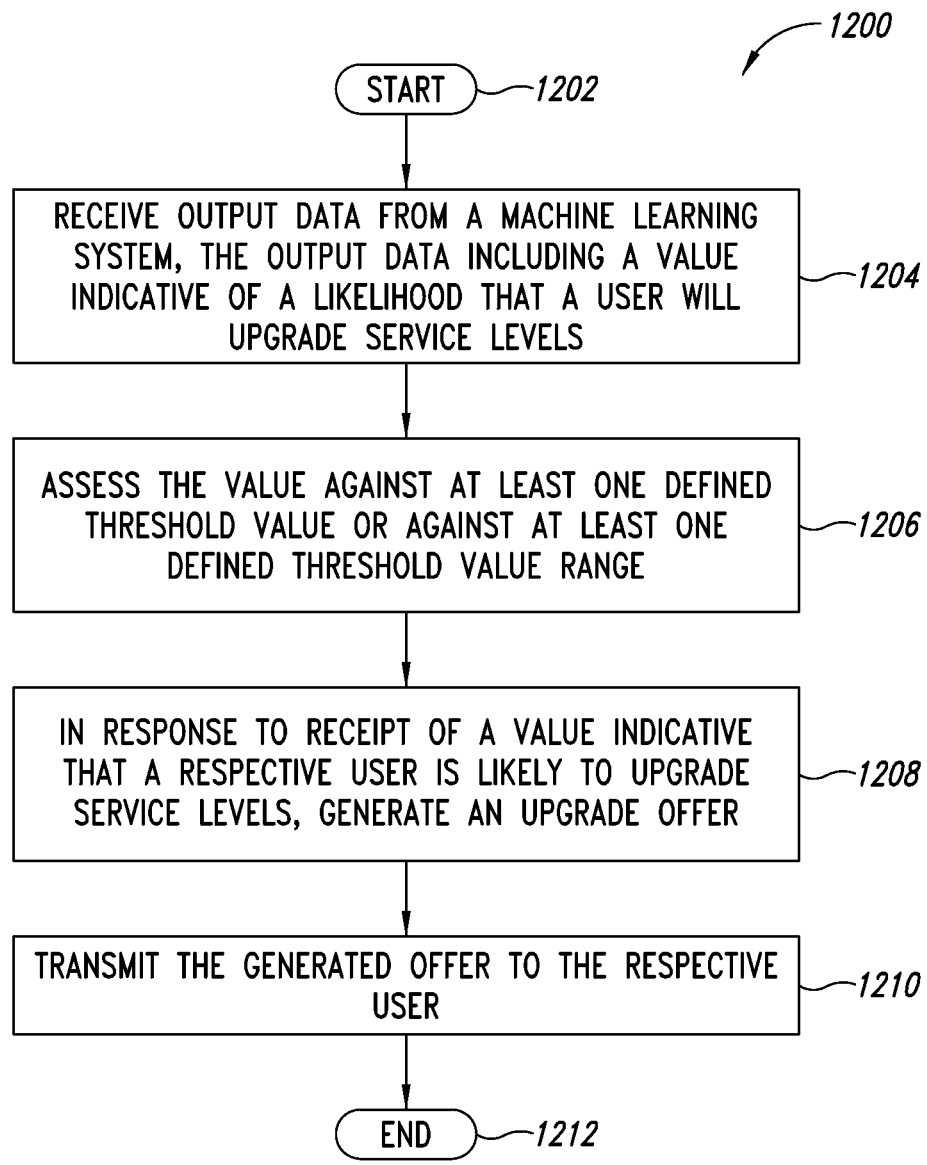
FIG. 12 is a high level flow diagram of an illustrative machine learning system method in which a back-end system receives output data from the output layer of the machine learning system, assesses the output data against one or more threshold values or threshold value ranges, and generates an upgrade offer for transmission to those users who have been determined likely to upgrade by the machine learning system, according to one non-limiting illustrated embodiment.

FIG. 12 shows a method 1200 of generating and communicating by a back-end system 160 upgrade offers 170 to any number of users 102 based on machine learning system output data 148 received by one or more back-end systems 160, according to an illustrated embodiment. The output data 148 provided by a trained machine learning system 140 includes at least one or more values indicative of a likelihood that a particular user 102 will upgrade service levels. A back-end system 160 receiving such output data 148 can generate and communicate service level upgrade offers 170 to users 102 that are logically associated with output data 148 that includes values exceeding one or more threshold values or falling within one or more threshold value ranges. In some instances, the back-end system 160 may alter, adjust, and/or personalize an upgrade offer 170 for a user 102 based on one or more values included in the output data 148 associated with the respective user. The method 1200 of generating and communicating by a back-end system 160 upgrade offers 170 to any number of users 102 based on machine learning system output data 148 received by one or more back-end systems 160 commences at 1202.

At 1204, the back-end system 160 receives output data 148 from the output layer 146 of the machine learning system 140. The output data 148 includes at least a value indicative of a likelihood that the user will upgrade service levels. In at least some instances, the magnitude of the value included in the output data 148 may provide an indication of the confidence that a particular user 102 will upgrade. For example a higher value may indicate a greater degree of confidence that the particular user will upgrade service levels while a lower value may indicate a lesser degree of confidence that the particular user will upgrade service levels.

At 1206, the at least one back-end system processor 162 assesses the received value for a particular user against at least one threshold value or at least one threshold value range to identify whether the particular user is likely to upgrade service levels.

At 1208, the at least one back-end system processor 162 generates at least one upgrade offer 170 for communication to a particular user responsive to the identification of the user as one who is likely to upgrade service levels at 1206. In some instances, the upgrade offer 170 may reflect the degree of confidence of in the likelihood that the particular user 102 will upgrade service levels.

For example, output data 148 that includes a value indicative of a high degree of confidence that a user 102*a* will upgrade service levels may result in the generation of an upgrade offer 170 of $12.95/month for the respective user 102 by the at least one back-end system processor 162. On the other hand, output data 148 that includes a value indicative of a low degree of confidence that a user 102 will upgrade service levels may result in the generation of an upgrade offer 170 of $9.95/month for the respective user 102 by the at least one back-end system processor 162.

At 1210, the back-end system 160 communicates the upgrade offer 170 to the respective user 102. The method 1200 of generating and communicating by a back-end system 160 upgrade offers 170 to any number of users 102 based on machine learning system output data 148 received by one or more back-end systems 160 concludes at 1212.

Figure 13:
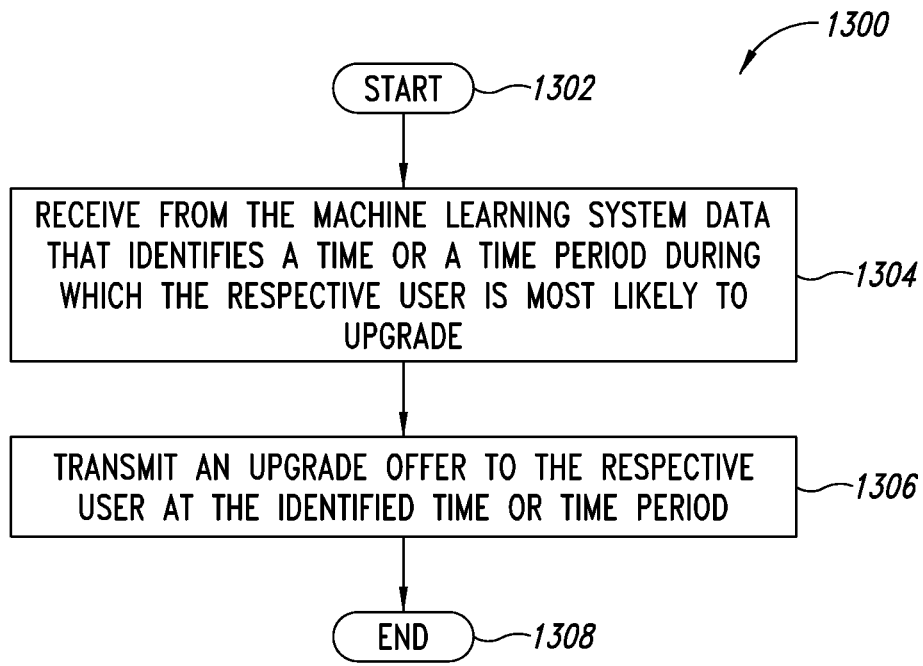
FIG. 13 is a high level flow diagram of an illustrative machine learning system method in which a back-end system communicates an upgrade offer at a time or during a temporal range when the respective user has been identified as most likely to upgrade service levels, according to one non-limiting illustrated embodiment.

FIG. 13 shows a method 1300 of communicating an upgrade offer 170 to a user 102 by the back-end system 160 at a time or during a temporal range when the respective user 102 has been identified as most likely to upgrade service levels, according to an illustrated embodiment. In addition to a value indicative of the likelihood that a particular user will upgrade, in some implementations, the output data 148 provided by the machine learning system 140 may include additional data such as an indication of a time or a temporal range over which a particular user is most likely to upgrade service levels. Communicating an upgrade offer 170 at the time a user 102 is most likely to upgrade advantageously increases the likelihood of success of acceptance of the upgrade offer by the user 102. The method 1300 of communicating an upgrade offer 170 to a user at a time the user is most likely to upgrade service levels commences at 1302.

At 1304, the at least one back-end system processor 162 receives output data 148 from the output layer 146 of the machine learning system 140. The output data 148 includes at least a value indicative of a time or temporal range during which the respective user 102 is most likely to upgrade service levels. In at least some instances, if the time or temporal range lies in the future, the at least one back-end system processor 162 can store the data in the back-end system processor-readable, non-transitory, storage medium 164 for future generation and communication of an upgrade offer 170 to the respective user 102.

At 1306, the at least one back-end system processor 162 generates and communicates an upgrade offer 170 to a user 102 at the identified time or during the identified temporal range during which the respective user is most likely to upgrade service levels. The method 1300 of communicating an upgrade offer 170 to a user at a time the user is most likely to upgrade service levels concludes at 1308.

Figure 14:
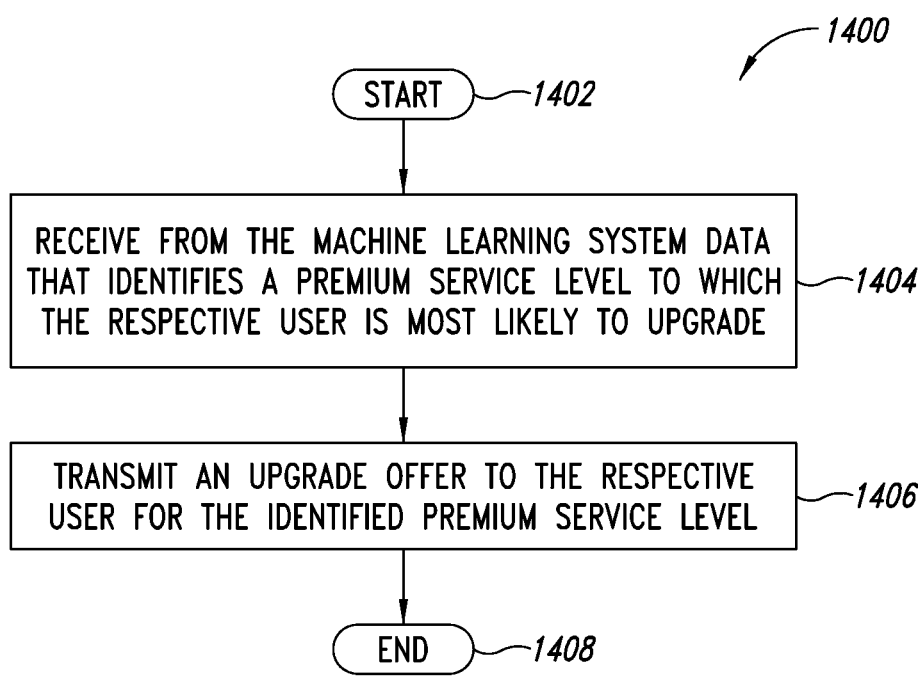
FIG. 14 is a high level flow diagram of an illustrative machine learning system method in which a back-end system communicates an upgrade offer to upgrade to a particular service level to which a user has been identified as most likely to upgrade, according to one non-limiting illustrated embodiment.

FIG. 14 shows a method 1400 of communicating an upgrade offer 170 that includes an offer to upgrade to a service level to which a user 102 has been identified by the back-end system 160 as most likely to upgrade, according to an illustrated embodiment. In addition to a value indicative of the likelihood that a particular user will upgrade, in some implementations, the output data 148 provided by the machine learning system 140 may include additional data such as an indication of a particular service level to which a user is most likely to upgrade. Communicating an upgrade offer 170 for the particular service level to the respective user 102 advantageously increases the likelihood of success of acceptance of the upgrade offer by the user. The method 1300 of communicating an upgrade offer 170 for the identified level to which the respective user 102 is most likely to upgrade commences at 1402.

At 1404, the at least one back-end system processor 162 receives output data 148 from the output layer 146 of the machine learning system 140. The output data 148 includes at least a value indicative of a particular service level to which a user 102 is most likely to upgrade.

At 1406, the at least one back-end system processor 162 generates and communicates to a user an upgrade offer 170 for the identified level to which the respective user 102 is most likely to upgrade. The method 1400 of communicating an upgrade offer 170 for the identified level to which the respective user 102 is most likely to upgrade concludes at 1408.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A training system to train at least a machine learning system that identifies users likely to upgrade from a lower service level to a higher service level offered by a service provider, the system comprising:
   at least one front-end, non-transitory, processor-readable, storage medium that stores at least one of processor-executable instructions or data; and
   at least one front-end system processor communicably coupled to an input layer of a machine learning system and to the at least one front-end, non-transitory, processor-readable, storage medium, the at least one front-end system processor that in use, executes the processor-executable instructions and in response:
   form an initial data set from data representative of a user population, the initial data set including at least:
      a training data subset that includes digital data representative of attribute value information logically associated with a number of known upgraded users and digital data representative of attribute value information logically associated with a number of known non-upgraded users;
   receive output data from an output layer of the machine learning system;
   determine whether one or more training parameters indicative of one or more performance aspects of the machine learning system has plateaued and whether a defined number of machine learning system training epochs has been reached;
   terminate the provision of the training data subset to the machine learning system responsive to determining that the defined number of machine learning system training epochs has been reached and determining that the one or more training parameters has plateaued;
   provide at least a portion of the training data subset as training examples to the input layer of the machine learning system;
   from the training parameters of the machine learning system, identify a defined service level to which the respective user is predicted to most likely upgrade;
   from the training parameters of the machine learning system, identify a time or temporal range as most likely for the respective user to upgrade service levels; and in response to identifying the defined service level to which the respective user is predicted to most likely upgrade and identifying the time or temporal range most likely for the respective user to upgrade service levels, generate and communicate an upgrade offer for the respective user indicative at the time or temporal range identified as most likely for the respective user to upgrade service levels and for the defined service level to which the respective user is predicted to most likely upgrade.

2. The training system of claim 1 wherein the processor-executable instructions that cause the at least one front-end system processor to form an initial data set including at least a training data set from a user population, further cause the at least one front-end system processor to:
  form an initial data set from the user population that, in addition to the training data subset, further comprises a test data subset including digital data representative of attribute value information logically associated with a number of known upgraded users and digital data representative of attribute value information logically associated with a number of known non-upgraded users.

3. The training system of claim 2 wherein the processor-executable instructions that cause the at least one front-end system processor to form the initial data set from the user population, the initial data set including at least the training data subset and the test data subset, further cause the at least one front-end system processor to:
  form the initial data set that includes digital data representative of attribute value information logically associated with each of the users, the attribute value information corresponding to at least one of: a number of user profile attributes associated with each of at least some of the users, or a number of user behavioral attributes associated with each of at least some of the users.

4. The training system of claim 3 wherein the processor-executable instructions that cause the at least one front-end system processor to form an initial data set that includes digital data representative of user-profile attribute value information logically associated with each of at least some of the users further cause the at least one front-end system processor to:
  form an initial data set that includes digital data representative of user profile attribute value information corresponding to a number of profile attributes that include one or more of:
  a value representative of the respective user's age;
  a value representative of the respective user's location;
  a value representative of the respective user's income;
  a value representative of the respective user's degree of commitment;
  a value representative of the respective user's height;
  a value representative of the respective user's body type;
  a value representative of the respective user's marital status;
  a value representative of the respective user's children;
  a value representative of the respective user's employment;
  a value representative of the respective user's religion;
  a value representative of the respective user's tobacco use;
  a value representative of the respective user's interest/lack of interest in another's children;
  a value representative of the respective user's interest/lack of interest in another's tobacco use;
  a value representative of the respective user's interest/lack of interest in another's ethnicity;
  a value representative of the respective user's interest/lack of interest in having children in the future;
  a value representative of the respective user's highest level of education;
  a value representative of the respective user's communication device type;
  a value representative of the respective user's communication device operating system;
  a value representative of the respective user's communication device Web browser;
  a value representative of the respective user's Internet protocol (IP) address;
  a value representative of the respective user's Internet service provider (ISP); and
  a value representative of the respective user's ISP location.

5. The system of claim 3 wherein the processor-executable instructions that cause the at least one front-end system processor to form an initial data set that includes digital data representative of attribute value information logically associated with each of at least some of the users further causes the at least one front-end system processor to:
  form an initial data set that includes digital data representative of user behavior attribute value information corresponding to a number of profile attributes that include one or more of:
  a value representative of an average elapsed time since the respective user's first association with the service provider;
  a value representative of an average elapsed time for the respective user to respond to incoming communications from other users; and
  a value representative of an average correspondence length from the respective user to one or more other users of one or more services provided by the service provider.

6. The system of claim 2 wherein the processor-executable instructions that cause the at least one front-end system processor to form an initial data set from a user population, the initial data set including at least a training data subset and a test data subset, further cause the at least one front-end system processor to:
  apportion the initial data set into the training data subset and the test data subset;
    wherein the known upgraded users included in the training data subset are mutually exclusive of the known upgraded users included in the test data subset; and
    wherein the known non-upgraded users included in the training data subset are mutually exclusive of the known non-upgraded users included in the test data subset.

7. The training system of claim 2 wherein the processor-executable instructions further cause the at least one front-end system processor to:
  provide at least a portion of the test data subset to a trained machine learning system;
  receive output data from an output layer of the trained machine learning system, the output data indicative of a probability that a particular user included in the test data subset will upgrade from a lower service level to a higher service level offered by a service provider based at least in part on the attribute value information logically associated with the particular user;

form a logical association linking the output data received from the output layer of the trained machine learning system to the particular user;

compare the output data logically associated with the particular user with data indicative of whether the particular user is a known upgraded user or a known non-upgraded user; and assess at least one accuracy parameter associated with the trained machine learning system.

8. The training system of claim 7 wherein the processor-executable instructions further cause the at least one front-end system processor to:

from time-to-time, autonomously review the user population to identify at least one of: known upgraded users or known non-upgraded users present in the user population; and autonomously update the training data subset to generate an updated training data subset and autonomously update the test data subset to generate an updated test data subset.

9. The training system of claim 8 wherein the processor-executable instructions further cause the at least one front-end system processor to:

from time-to-time, autonomously provide at least the updated training data subset to the input layer of the machine learning system to provide an updated, trained, machine learning system;

from time-to-time, autonomously provide at least the updated test data subset to the input layer of the updated, trained, machine learning system;

receive output data from the output layer of the updated, trained, machine learning system, the output data indicative of a probability that a particular user included in the updated test data subset will upgrade from a lower service level to a higher service level offered by a service provider based at least in part on the attribute value information logically associated with the particular user;

form a logical association linking the output data received from the output layer of the updated, trained, machine learning system to the particular user;

compare the output data logically associated with the particular user with data indicative of whether the particular user is a known upgraded user or a known non-upgraded user; and assess at least one accuracy parameter associated with the updated, trained, machine learning system.

10. The training system of claim 9 wherein the processor-executable instructions that cause the at least one front-end system processor to assess at least one accuracy parameter associated with the updated, trained, machine learning system further cause the at least one front-end system processor to:

autonomously compare the accuracy of at least one updated predictive model used by the updated, trained, machine learning system with one or more defined accuracy threshold values; and reject the at least one predictive model responsive to the accuracy of the at least one updated predictive model falling below the one or more defined accuracy threshold values.

11. The training system of claim 1 wherein the processor-executable instructions further cause the at least one front-end system processor to:

generate hypothetical user attribute value information; and form a logical association that links the generated hypothetical user attribute value information to one of a number of hypothetical users.

12. The training system of claim 11 wherein the processor-executable instructions that cause the at least one front-end system processor to generate hypothetical user attribute value cause the at least one front-end system processor to:

generate the hypothetical user attribute value information by autonomously altering attribute value information logically associated with a known upgraded user included in the user population.

13. The training system of claim 12 wherein the processor-executable instructions that cause the at least one front-end system processor to form an initial data set from a user population, the initial data set including at least a training data subset, further cause the at least one front-end system processor to:

form an initial data set from a user population, the initial data set including at least a training data subset that includes digital data representative of attribute value information logically associated with the number of known upgraded users, the number of known non-upgraded users, and a number of front-end system generated hypothetical upgraded users.

14. The training system of claim 1 wherein the processor-executable instructions that cause the at least one front-end system processor to provide the machine learning system with at least the training data subset as training examples, further cause the at least one front-end system processor to:

provide the machine learning system with at least the training data subset as training examples, wherein the machine learning system includes a neural network;

establish connections within the neural network based at least in part on the attribute values logically associated with users included in the training data subset; and weight the connections within the neural network based at least in part on the attribute values logically associated with users included in the training data subset.

15. The training system of claim 14 wherein the processor-executable instructions that cause the at least one front-end system processor to weight the connections within the neural network further cause the at least one front-end system processor to:

weight the connections within the neural network using back propagation.

16. The training system of claim 1 wherein the processor-executable instructions that cause the at least one front-end system processor to provide the machine learning system with at least the training data subset as training examples, further cause the at least one front-end system processor to:

provide the machine learning system with at least the training data subset as training examples, wherein the machine learning system includes at least one of a boosted trees analysis model or a random forests analysis model.

17. The training system of claim 1 wherein the processor-executable instructions that cause the at least one front-end system processor to provide the machine learning system with at least the training data subset as training examples, further cause the at least one front-end system processor to:

receive output data from an output layer of the machine learning system;

determine whether one or more training parameters indicative of one or more performance aspects of the machine learning system has plateaued; and terminate the provision of the machine learning system with the training data subset in response to determining that the one or more training parameters has plateaued.

18. The training system of claim 17 wherein the processor-executable instructions that cause the at least one front-end system processor to determine whether one or more training parameters indicative of one or more performance aspects of the machine learning system has plateaued further causes the at least one front-end system processor to:
determine whether a defined number of machine learning system training epochs has been reached; and
terminate the provision of the training data subset to the machine learning system responsive to determining that the defined number of machine learning system training epochs has been reached.

19. The training system of claim 1, further comprising:
at least one communications interface communicably coupled to the at least one front-end system processor, the at least one communications interface communicably coupleable via one or more intervening networks to any number of user processor-based devices, each of the user processor based devices logically associated with at least one users included in the user population.

20. The training system of claim 19 wherein the one or more intervening networks comprises the Internet.

21. A method of training at least a machine learning system that identifies users likely to upgrade from a lower service level to a higher service level offered by a service provider, the method comprising:
forming by at least one front-end system processor an initial data set from a user population, the initial data set including at least:
a training data subset that includes digital data representative of attribute value information logically associated with a number of known upgraded users and with a number of known non-upgraded users;
determining whether one or more training parameters indicative of one or more performance aspects of the machine learning system has plateaued and whether a defined number of machine learning system training epochs has been reached; and
terminating the provision of the training data subset to the machine learning system responsive to determining that the defined number of machine learning system training epochs has been reached and determining that the one or more training parameters has plateaued;
providing the machine learning system with at least a portion of the training data subset as a training example;
from the training parameters of the machine learning system, identify a defined service level to which the respective user is predicted to most likely upgrade;
from the training parameters of the machine learning system, identify a time or temporal range as most likely for the respective user to upgrade service levels; and
in response to identifying the defined service level to which the respective user is predicted to most likely upgrade and identifying the time or temporal range most likely for the respective user to upgrade service levels, generate and communicate an upgrade offer for the respective user indicative at the time or temporal range identified as most likely for the respective user to upgrade service levels and for the defined service level to which the respective user is predicted to most likely upgrade.

22. The training method of claim 21 wherein forming by the at least one processor the initial data set from the user population further includes:
forming, by the at least one front-end system processor, the initial data set from the user population to further include a test data subset including digital data representative of attribute value information logically associated with a number of known upgraded users and digital data representative of attribute value information logically associated with a number of known non-upgraded users.

23. The training method of claim 22 wherein forming the initial data set from the user population, the initial data set including at least the training data subset and the test data subset further includes:
forming, by the at least one front-end system processor, the initial data set that includes digital data representative of attribute value information logically associated with each of the users, the attribute value information corresponding to at least one of: a number of user profile attributes associated with each of at least some of the users, or a number of user behavioral attributes associated with each of at least some of the users.

24. The training method of claim 23 wherein forming the initial data set that includes digital data representative of user profile attribute value information logically associated with each of at least some of the users includes:
forming, by the at least one front-end system processor, the initial data set to include digital data representative of user profile attribute value information corresponding to a number of user profile attributes that include one or more of:
a value representative of the respective user's age;
a value representative of the respective user's location;
a value representative of the respective user's income;
a value representative of the respective user's degree of commitment;
a value representative of the respective user's height;
a value representative of the respective user's body type;
a value representative of the respective user's marital status;
a value representative of the respective user's children;
a value representative of the respective user's employment;
a value representative of the respective user's religion;
a value representative of the respective user's tobacco use;
a value representative of the respective user's interest/lack of interest in another's children;
a value representative of the respective user's interest/lack of interest in another's tobacco use;
a value representative of the respective user's interest/lack of interest in another's ethnicity;
a value representative of the respective user's interest/lack of interest in having children in the future;
a value representative of the respective user's highest level of education;
a value representative of the respective user's communication device type;
a value representative of the respective user's communication device operating system;
a value representative of the respective user's communication device Web browser;
a value representative of the respective user's Internet protocol (IP) address;

a value representative of the respective user's Internet service provider (ISP); and a value representative of the respective user's ISP location.

25. The training method of claim 23 wherein forming the initial data set that includes digital data representative of user behavior attribute value information logically associated with each of at least some of the users includes forming, by the at least one front-end system processor, the initial data set to include digital data representative of user behavior attribute value information corresponding to a number of user behavior profile attributes that include at least one of:

a value representative of an average elapsed time since the respective user's first association with the service provider;

a value representative of an average elapsed time for the respective user to respond to incoming communications from other users; and a value representative of an average correspondence length from the respective user to one or more other users of one or more services provided by the service provider.

26. The training method of claim 22 wherein forming the initial data set from the user population includes:

apportioning, the initial data set into the training data subset and the test data subset;

wherein the known upgraded users included in the training data subset are mutually exclusive of the known upgraded users included in the test data subset; and wherein the known non-upgraded users included in the training data subset are mutually exclusive of the known non-upgraded users included in the test data subset.

27. The training method of claim 22, further comprising:

providing, by the at least one front-end system processor, at least a portion of the test data subset to a trained machine learning system;

receiving, by the at least one front-end system processor, output data from an output layer of the trained machine learning system, the output data indicative of a probability that a particular user included in the test data subset will upgrade from a lower service level to a higher service level offered by a service provider based at least in part on the attribute value information logically associated with the particular user;

forming, by the at least one front-end system processor, a logical association linking the output data received from the output layer of the trained machine learning system to the particular user;

comparing, by the at least one front-end system processor, the received output data logically associated with the particular user with data indicative of whether the particular user is a known upgraded user or a known non-upgraded user; and assessing, by the at least one front-end system processor, at least one accuracy parameter associated with the trained machine learning system.

28. The training method of claim 27, further comprising:

from time-to-time, autonomously reviewing, by the at least one front-end system processor, the user population to identify at least one of: known upgraded users or known non-upgraded users present in the user population; and autonomously updating, by the at least one front-end system processor, the training data subset to generate an updated training data subset and autonomously update the test data subset to generate an updated test data subset.

29. The training method of claim 28, further comprising:

from time-to-time, autonomously providing, by the at least one front-end system processor, at least the updated training data subset to an input layer of the machine learning system to provide an updated, trained, machine learning system;

from time-to-time, autonomously providing, by the at least one front-end system processor, at least the updated test data subset to the input layer of the updated, trained, machine learning system;

receiving, by the at least one front-end system processor, output data from the output layer of the updated, trained, machine learning system, the output data indicative of a probability that a particular user included in the updated test data subset will upgrade from a lower service level to a higher service level offered by a service provider based at least in part on the attribute value information logically associated with the particular user;

forming, by the at least one front-end system processor, a logical association linking the output data received from the output layer of the updated, trained, machine learning system to the particular user;

comparing, by the at least one front-end system processor, the received output data logically associated with the particular user with data indicative of whether the particular user is a known upgraded user or a known non-upgraded user; and assessing, by the at least one front-end system processor, at least one accuracy parameter associated with the updated, trained, machine learning system.

30. The training method of claim 29 wherein assessing at least one accuracy parameter associated with the trained machine learning subsystem includes:

autonomously comparing, by the at least one front-end system processor, the accuracy of the trained machine learning system with one or more defined accuracy threshold values; and rejecting, by the at least one front-end system processor, the updated user upgrade predictive model responsive to the accuracy of the updated user upgrade predictive model falling below the one or more defined accuracy threshold values.

31. The training method of claim 21, further comprising:

generating, by the at least one front-end system processor, hypothetical user attribute value information; and forming, by the at least one front-end system processor, a logical association linking the generated hypothetical user attribute value information to one of a number of hypothetical users.

32. The training method of claim 31 wherein generating the hypothetical user attribute value information logically associated with one of a number of hypothetical users includes:

generating, by the at least one front-end system processor, the attribute value information by autonomously altering attribute value information logically associated with a known upgraded user included in the user population.

33. The training method of claim 32 wherein forming the initial data set including at least the training data subset from the user population includes:

forming, by the at least one front-end system processor the initial data set from the user population, the initial data set including at least the training data subset that includes digital data representative of attribute value information logically associated with each of the number of known upgraded users, with each of the number of known non-upgraded users, and with each of a number of front-end system generated hypothetical upgraded users.

34. The training method of claim 21 wherein providing the machine learning system with at least the training data subset as training examples includes:
providing, by the at least one front-end system processor, the machine learning system with at least the training data subset as training examples, wherein the machine learning system includes a neural network;
establishing connections within the neural network based at least in part on the attribute values logically associated with users included in the training data subset; and
weighting the connections within the neural network based at least in part on the attribute values logically associated with users included in the training data subset.

35. The training method of claim 34 wherein weighting the connections within the neural network includes:
weighting the connections within the neural network using back propagation or back propagation with momentum.

36. The training method of claim 21 wherein providing the machine learning system with at least the training data subset as training examples includes:
providing, by the at least one front-end system processor, at least the training data subset as training examples to the machine learning system, the machine learning system includes at least a boosted trees analysis or a random forests analysis.

37. The training method of claim 21 wherein providing the machine learning system with at least the training data subset as training examples includes:
receiving, by the at least one front-end system processor, output data from an output layer of the machine learning system;
determining, by the at least one front-end system processor, whether one or more training parameters indicative of one or more performance aspects of the machine learning system has plateaued; and
terminating, by the at least one front-end system processor, the provision of the machine learning system with the training data subset in response to determining that the one or more training parameters has plateaued.

38. The training method of claim 37 wherein determining whether one or more training parameters indicative of one or more performance aspects of the machine learning system has plateaued includes:
determining, by the at least one front-end system processor, whether a defined number of machine learning system training epochs has been reached; and
responsive to determining that the defined number of machine learning system training epochs has been reached, terminating the provision of the training data subset, by the at least one front-end system processor, to the machine learning system.

39. An upgrade offer presentation system that identifies users likely to upgrade from a lower service level to a higher service level offered by a service provider and provides upgrade offers to candidate users identified as likely to upgrade, comprising:
at least one back-end, non-transitory, processor-readable, storage medium that stores processor-executable instructions; and
at least one back-end system processor communicably coupled to an output layer of a machine learning system and to the at least one back-end, non-transitory, processor-readable, storage medium, the at least one back-end system processor to execute the processor-executable instructions and in response:
receive output data from the output layer of the machine learning system, the output data including, for each of at least some users included in a user population, at least a value indicative of a likelihood that the respective user will upgrade from a lower service level to a higher service level offered by a service provider;
determine whether one or more training parameters indicative of one or more performance aspects of the machine learning system has plateaued and whether a defined number of machine learning system training epochs has been reached;
terminate the provision of the training data subset to the machine learning system responsive to determining that the defined number of machine learning system training epochs has been reached and determining that the one or more training parameters has plateaued;
assess the value indicative of the likelihood that the respective user will upgrade against at least one defined threshold value or at least one defined threshold value range;
from the training parameters of the machine learning system, identify a defined service level to which the respective user is predicted to most likely upgrade;
from the training parameters of the machine learning system, identify a time or temporal range as most likely for the respective user to upgrade service levels; and
in response to identifying the defined service level to which the respective user is predicted to most likely upgrade and identifying the time or temporal range most likely for the respective user to upgrade service levels, generate and communicate an upgrade offer for the respective user indicative at the time or temporal range identified as most likely for the respective user to upgrade service levels and for the defined service level to which the respective user is predicted to most likely upgrade.

40. The offer presentation system of claim 39 wherein the processor-executable instructions that cause the at least one back-end system processor to generate an upgrade offer for the respective user further cause the at least one back-end system processor to:
for each of the at least some of the users in the population of users:
responsive to the receipt of the output data from output layer of the machine learning system that further includes information indicative of a future time at which the respective user is predicted to most likely upgrade, autonomously generate an upgrade offer for the respective user at the future time; and
transmit the upgrade offer to the respective user at the future time.

41. The offer presentation system of claim 39 wherein the processor-executable instructions that cause at least one back-end system processor to generate an upgrade offer for the respective user further cause at least one back-end system processor to:
for each of the at least some of the users in the population of users:
responsive to the receipt of output data from the output layer of the machine learning system that further includes information indicative of a defined service level to which the respective user is predicted to most likely upgrade, autonomously generate an upgrade offer for the defined service level; and
transmit the upgrade offer for the defined service level to the respective user.

42. The upgrade offer presentation system of claim 39, further comprising:
a training system to train at least a machine learning system that identifies users likely to upgrade from a lower service level to a higher service level offered by a service provider, the system comprising:
at least one front-end, non-transitory, processor-readable, storage medium that stores processor-executable instructions; and
at least one front-end system processor communicably coupled to the at least one front-end, non-transitory, processor-readable, storage medium and to an input layer of the machine learning system, the at least one front-end system processor to execute the processor-executable instructions and in response:
form an initial data set using data representative of a user population, the initial data set including at least:
a training data subset that includes digital data representative of attribute value information logically associated with a number of known upgraded users and with a number of known non-upgraded users; and
provide the machine learning system with at least the training data subset as training examples.

43. The upgrade offer presentation system of claim 42 wherein the processor-executable instructions further cause at least one front-end system processor to:
receive input data indicative of one or more attribute values from each of the number of users in the user population;
form a logical association linking the one or more received attribute values to the respective user; and
store data indicative of the received attribute values and the logical association in a data structure in the at least one front-end, non-transitory, processor-readable, storage medium communicably coupled to the at least one front-end system processor.

44. The upgrade offer presentation system of claim 42, wherein
the processor-executable instructions that cause the at least one front-end system processor to form an initial data set including at least a training data subset using data representative of a user population, further cause the at least one front-end system processor to:
form the initial data set using data representative of a user population to further include a test data subset including digital data representative of attribute value information logically associated with a number of known upgraded users and digital data representative of attribute value information logically associated with a number of known non-upgraded users.

45. The upgrade offer presentation system of claim 44, wherein the processor-executable instructions further cause the at least one back-end processor to:

autonomously transmit data indicative of known upgraded users present in the user population and data indicative of known non-upgraded users present in the user population to the at least one front-end processor; and
wherein the processor-executable instructions further cause the at least one front-end processor to:
receive the data indicative of known upgraded users present in the user population and data indicative of known non-upgraded users present in the user population transmitted by the back-end processor;
autonomously update the data representative of attribute values logically associated with the number of known upgraded users in the training data subset with the data indicative of at least some of the known upgraded users transmitted by the back-end processor;
autonomously update the data representative of attribute values logically associated with the number of known upgraded users in the test data subset with the data indicative of at least some of the known upgraded users transmitted by the back-end processor;
autonomously update the data representative of attribute values logically associated with the number of known non-upgraded users in the training data subset with the data indicative of at least some of the known non-upgraded users transmitted by the back-end processor; and
autonomously update the data representative of attribute values logically associated with the number of known non-upgraded users in the test data subset with the data indicative of at least some of the known non-upgraded users transmitted by the back-end processor.

46. The upgrade offer presentation system of claim 42, wherein a single system comprises the front-end system and the back-end system.

47. A method of operating upgrade offer presentation system that identifies users likely to from a lower service level to a higher service level offered by a service provider and provides upgrade offers to candidate users identified as likely to upgrade, the method comprising:
receiving, by at least one back-end system processor, output data from an output layer of a machine learning system communicably coupled to the at least one back-end system processor, the output data including, for each of at least some users included in a user population, at least a value indicative of a likelihood that the respective user will upgrade from a lower service level to a higher service level offered by a service provider;
determining whether one or more training parameters indicative of one or more performance aspects of the machine learning system has plateaued and whether a defined number of machine learning system training epochs has been reached; and
terminating the provision of the training data subset to the machine learning system responsive to determining that the defined number of machine learning system training epochs has been reached and determining that the one or more training parameters has plateaued;
assessing, by the at least one back-end system processor, the value indicative of the likelihood that the respective user will upgrade against at least one defined threshold value or at least one defined threshold value range;
from the training parameters of the machine learning system, identify a defined service level to which the respective user is predicted to most likely upgrade;

from the training parameters of the machine learning system, identify a time or temporal range as most likely for the respective user to upgrade service levels; and in response to identifying the defined service level to which the respective user is predicted to most likely upgrade and identifying the time or temporal range most likely for the respective user to upgrade service levels, generate and communicate an upgrade offer for the respective user indicative at the time or temporal range identified as most likely for the respective user to upgrade service levels and for the defined service level to which the respective user is predicted to most likely upgrade.

48. The upgrade offer presentation method of claim 47:
wherein generating an upgrade offer for the respective user includes:
autonomously generating an upgrade offer, by the at least one back-end system processor, for the respective user at a future time responsive to the receipt of the output data from the output layer of the machine learning system that includes information indicative of the future time at which the respective user is predicted to most likely upgrade; and
wherein transmitting the generated upgrade offer to the respective user includes:
transmitting, by the at least the upgrade offer to the respective user at the future time.

49. The upgrade offer presentation method of claim 47 wherein generating an upgrade offer for the respective user includes:
autonomously generating an upgrade offer, by the at least one back-end processor, for a defined service level responsive to the receipt of output data from the output layer of the machine learning system that includes information indicative of a defined service level to which the respective user is predicted to most likely upgrade.

50. The upgrade offer presentation method of claim 47, further comprising:
forming, by at least one front-end system processor communicably coupled to an input layer of the machine learning system, an initial data set using data representative of a user population, the initial data set including at least:
a training data subset that includes digital data representative of attribute value information logically associated with a number of known upgraded users and with a number of users consisting of known non-upgraded users; and
providing, by the at least one front-end system processor, at least the training data subset as training examples to the input layer of the machine learning system.

51. The upgrade offer presentation method of claim 50, further comprising:
receiving, by at least one front end-system processor, input data indicative of one or more attribute values from each of the number of users in the user population;
forming, by the at least one front-end system processor, a logical association linking the one or more received attribute values with the respective user; and
storing, by the at least one front-end system processor, the received input data indicative of the attribute values and the logical association in a data structure in at least one front-end, non-transitory, processor-readable, storage medium communicably coupled to the at least one front-end system processor.

52. The upgrade offer presentation method of claim 50 wherein forming the initial data set including at least the training data subset, includes:
forming, by the at least one front-end system processor, the initial data set using data representative of the user population to further include a test data subset including digital data representative of attribute value information logically associated with a number of known upgraded users and digital data representative of attribute value information logically associated with a number of known non-upgraded users.

53. The upgrade offer presentation method of claim 50, further comprising:
autonomously transmitting, by the at least one back-end system processor, data indicative of known upgraded users present in the user population and data indicative of known non-upgraded users present in the user population to the at least one front-end processor;
receiving, by the at least one front-end system processor, the data indicative of known upgraded users present in the user population and data indicative of known non-upgraded users present in the user population transmitted by the back-end processor;
autonomously updating, by the at least one front-end system processor, the data representative of attribute values logically associated with the number of known upgraded users in the training data subset with the data indicative of at least some of the known upgraded users transmitted by the back-end processor;
autonomously updating, by the at least one front-end system processor, the data representative of attribute values logically associated with the number of known upgraded users in the test data subset with the data indicative of at least some of the known upgraded users transmitted by the back-end processor;
autonomously updating, by the at least one front-end system processor, the data representative of attribute values logically associated with the number of known non-upgraded users in the training data subset with the data indicative of at least some of the known non-upgraded users transmitted by the back-end processor; and
autonomously updating, by the at least one front-end system processor, the data representative of attribute values logically associated with the number of known non-upgraded users in the test data subset with the data indicative of at least some of the known non-upgraded users transmitted by the back-end processor.

\* \* \* \* \*

UNITED STATES PATENT AND TRADEMARK OFFICE
CERTIFICATE OF CORRECTION

PATENT NO. : 10,387,795 B1
APPLICATION NO. : 14/672749
DATED : August 20, 2019
INVENTOR(S) : Steve Oldridge et al.

Page 1 of 1

It is certified that error appears in the above-identified patent and that said Letters Patent is hereby corrected as shown below:

On the Title Page

Page 4, Column 1, Item (56), References Cited/Other Publications:
"Office Action, dated Feb. 28, 2018, for U.S. Appl. No. 14/679,782, Oldridge et al., "Apparatus, Method and Article to Predict and Prevent Chargebacks in a Network Environment," 64 pages."
Should read:
--Office Action, dated Feb. 28, 2018, for U.S. Appl. No. 14/679,792, Oldridge et al., "Apparatus, Method and Article to Predict and Prevent Chargebacks in a Network Environment," 64 pages.--.

Page 5, Column 2, Item (56), References Cited/Other Publications:
"Brammer, "Who Commits Online Advertising Fraus and How to Stip it," published online on Sep. 21, 2015, downloaded from http://blog.ezanga.com/blog/who-commits-online-avertising-fraud-and-how-to-stop-it on Jun. 16, 2018, 8 pages."
Should read:
--Brammer, "Who Commits Online Advertising Fraud and How to Stop it," published online on Sep. 21, 2015, downloaded from http://blog.ezanga.com/blog/who-commits-online-advertising-fraud-and-how-to-stop-it on Jun. 16, 2018, 8 pages.--.

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*